United States Patent

Nilssen

[11] Patent Number: 6,167,278
[45] Date of Patent: Dec. 26, 2000

[54] COMBINATION CORDLESS-CELLULAR TELEPHONE SYSTEM

[76] Inventor: Ole K. Nilssen, 408 Caesar Dr., Barrington, Ill. 60010

[21] Appl. No.: 08/004,598

[22] Filed: Jan. 14, 1993

Related U.S. Application Data

[63] Continuation-in-part of application No. 07/860,234, Mar. 27, 1992, Pat. No. 5,210,788, which is a continuation of application No. 07/627,189, Dec. 13, 1990, abandoned, which is a continuation-in-part of application No. 07/562,897, Aug. 6, 1990, Pat. No. 5,068,890, which is a continuation-in-part of application No. 07/397,266, Aug. 23, 1989, Pat. No. 5,070,522, which is a continuation-in-part of application No. 07/136,505, Dec. 23, 1987, Pat. No. 4,866,757, which is a continuation of application No. 06/921,381, Oct. 22, 1986, abandoned.

[51] Int. Cl.$^7$ ...................................................... H04M 1/27
[52] U.S. Cl. .............................................. 455/462; 379/59
[58] Field of Search .................................. 379/59, 61, 63, 379/58, 56, 62; 455/33.1, 31.1, 54.1, 56.1, 11.1, 69, 63, 126, 88

[56] References Cited

U.S. PATENT DOCUMENTS

| | | | |
|---|---|---|---|
| 4,723,265 | 2/1988 | Kamei et al. | 379/58 |
| 4,768,218 | 8/1988 | Yorita | 379/61 |
| 4,887,290 | 12/1989 | Dop et al. | 379/59 X |
| 4,939,769 | 7/1990 | Sakanishi et al. | 379/61 |
| 4,989,230 | 1/1991 | Gillig et al. | 379/59 |
| 5,103,474 | 4/1992 | Stoodley et al. | 379/58 |
| 5,127,042 | 6/1992 | Gillig et al. | 379/59 |
| 5,151,643 | 9/1992 | Emmert et al. | 379/61 X |
| 5,173,933 | 12/1992 | Jabs et al. | 379/58 |
| 5,204,970 | 4/1993 | Stengel et al. | 455/69 |
| 5,210,785 | 5/1993 | Sato et al. | 379/61 |
| 5,257,283 | 10/1993 | Gilhousen et al. | 379/59 X |
| 5,260,988 | 11/1993 | Schellinger et al. | 379/59 |
| 5,319,634 | 6/1994 | Bartholomew et al. | 379/61 X |
| 5,396,538 | 3/1995 | Hong | 379/58 |

OTHER PUBLICATIONS

Motorola Brochure #BIM–298, 1992 "Micro T.A.C".

*Primary Examiner*—William Cumming

[57] ABSTRACT

A special telephone instrument has a cordless hand-piece and one or more base-stations. Each base-station is hard-wire-connected with the ordinary telephone utility system and may include a built-in cellular transceiver. The hand-piece, which is powered by a built-in rechargeable battery, is—within its maximum cordless range (e.g., 500 feet)—connected with its nearest base-station via two-way radio transmission. When not in use, the hand-piece is at times resting in a cradle at its nearest base-station, thereby getting its battery recharged. When in use, the hand-piece is removed from its cradle. When so removed, the hand-piece may—while located within cordless range—be used for receiving and/or placing phone-calls via any one of the base-stations. When moved outside of cordless range, the hand-piece automatically converts to a cellular telephone, thereby permitting—not only the continuation of an ongoing conversation—but also the receiving and/or placing of telephone calls in any location served by a cellular telephone system. Thus, a person may have a base-station in his office whereat his cordless hand-piece is cradled most of the time during office hours, thereby maintaining the built-in battery fully charged. When he leaves his office, he would bring his cordless hand-piece (and his conversation) along; which hand-piece, after being removed outside of its cordless range, will automatically convert to a cellular telephone. Then, when he gets home after work, he would place his hand-piece into the cradle of another base-station; which hand-piece would automatically convert back to a regular cordless mode after having come within the cordless range of this other base-station.

4 Claims, 14 Drawing Sheets

6,167,278

COMBINATION CORDLESS-CELLULAR TELEPHONE SYSTEM

RELATED APPLICATIONS

This application is a Continuation-in-Part of Ser. No. 07/860,234 filed Mar. 27, 1992 now U.S. Pat. No. 5,210,788; which is a Continuation of Ser. No. 07/627,189 filed Dec. 13, 1990, now abandoned; which is a Continuation-in-Part of Ser. No. 07/562,897 filed Aug. 6, 1990, now U.S. Pat. No. 5,068,890; which is a Continuation-in-Part of Ser. No. 07/397,266 filed Aug. 23, 1989, now U.S. Pat. No. 5,070,522; which is a Continuation-in-Part of application Ser. No. 07/136,505 filed Dec. 23, 1987, now U.S. Pat. No. 4,866,757 issued Sep. 12, 1989; which is a Continuation of Ser. No. 06/921,381 filed Oct. 22, 1986, now abandoned.

FIELD OF THE INVENTION

The present invention relates to cordless and cellular telephone systems and instruments.

SUMMARY OF THE INVENTION

Objects of the Invention

A main object of the present invention is that of providing for an improved telephone system.

A more particular object is that of providing for a combination cordless-cellular telephone system functioning in a seamless manner between relatively short-range cordless domains and relatively long-range cellular domains.

These as well as other objects, features and advantages of the present invention will become apparent from the following description and claims.

Brief Description of the Invention

A special cordless telephone instrument has a cordless hand-piece and one or more dedicated base-stations. Each such base-station is hard-wire-connected with the ordinary telephone utility system and preferably includes a cellular telephone.

The cordless hand-piece, which is powered by a built-in rechargeable battery, is—within its maximum cordless operating range (e.g., up to perhaps as high as 1000 feet)—connected with its nearest base-station via two-way radio transmission.

When not in use, the hand-piece is—at least at times—resting in a cradle or receptacle at its nearest base-station, thereby automatically getting its battery recharged.

When in use, the hand-piece is removed from its cradle; and, when so removed, the hand-piece may—while located within the cordless operating range of one of its base-stations—be used for receiving and/or placing phone-calls via that base-station.

When located outside of the cord-less operating range of one of its base-stations, the hand-piece automatically converts to a hand-held cellular telephone instrument; which may then be used for receiving and/or placing telephone calls in any location served by an ordinary cellular telephone system.

Thus, a person may have a dedicated base-station in his office whereat his cordless hand-piece is cradled most of the time during his office hours, thereby keeping him tele-connected via his office telephone instrument and lines while maintaining the battery built into the hand-piece fully charged. When he leaves his office, he would bring his hand-piece along; which, after being taken outside of its cordless range with respect to his in-office base station, will automatically convert itself into a cellular telephone instrument; which will then keep him tele-connected while he is on his way home. That is, when leaving the cordless range, the system will automatically convert to a cellular mode, even in the middle of a conversation. When he gets home, he may place his hand-piece into the cradle of another dedicated base-station. In any case, his hand-piece will in effect automatically convert itself back to a regular cordless telephone mode as soon as it comes within the cordless range of his in-home base-station.

Brief Description of Related Invention

In a building's system for distributing telephone and other information-carrying signals to various signal utilization means, as well as electric power to various electric power utilization means, such telephone and other information-carrying signals are distributed along with electric power in a common distribution system wherein a signal conduction means (such as ordinary telephone wires, coaxial cable and/or optical fibers) and electric power conduction means are routed alongside each other to/from various end points at which electric power is being utilized, such as to/from electric lighting fixtures, wall switches, power receptacles, etc. At some of these end points, telephone and/or other information signal receptacles are provided alongside electric power receptacles. At others of these end points, the signal conduction means is connected with a radio transceiver and/or wireless signal radiating/receiving means, such as a small two-way radio antenna mounted at or near a ceiling lighting fixture; which radio antenna would interact in two-way manner with a two-way antenna and/or transceiver means combined with a telephone and/or some other information-handling instrument located nearby.

In addition to being used for transmitting telephone and/or other information-carrying signals, the signal conduction means is used for controlling the flow and/or usage of electric power, such as to control the output of light from each individual lighting fixtures, to provide for distributed protection against electrical circuit overload and/or for prevention of fire initiation hazards, such as is presently attained by routing electric power conductors within steel conduits or armor.

One of the telephone instruments connected with the common distribution system has a feature whereby the mere lifting of the receiver causes either a pre-programmed telephone number (or prefix) to be automatically dialed, but only after a brief delay; which brief delay provides for an opportunity to initiate dialing of some other telephone number before the dialing of the pre-programmed telephone number is actually executed.

In its ultimately preferred embodiment, the combination signal and power distribution system incorporates a special PBX (i.e., Private Branch Exchange) system so adapted as to make a given wireless telephone instrument operative automatically to access, and/or to be accessed from, the signal distribution part of the system by way of a small two-way antenna projecting into a room (as from one of the ceiling lighting fixtures) within which the given wireless telephone instrument is located. Thus, a person carrying this wireless telephone instrument will be able, automatically, to place and/or receive telephone calls wherever he might happen to be within a building (or within a system of buildings) wherein each room has a wireless connection or access point (such as via a small antenna on a ceiling lighting fixture) to the signal distribution part of the combined signal and power distribution system.

In its more immediately preferred embodiment, the related invention may be compactly described as follows.

In a building, such as an office building, a power and signal distribution system comprising:

(a) a central location whereat: (i) at a signal terminal means, wireless and/or hard-wire connections are made with some external communications facility, such as a local telephone company; (ii) at a main power terminal means, connection is made with, and unconditioned electric power is received from, the local electric utility company; and (iii) at an auxiliary power terminal means, connection is made with and conditioned electric power is received from an auxiliary source of electric power, which auxiliary source of electric power may advantageously include a storage battery means;

(b) main power conduction means, such as a set of relatively heavy-gauge electric conductors, connected with the main power terminal means; the main power conduction means being routed, at least in part, along a path to a set of main power utilization points within or near the building;

(c) auxiliary power conduction means, such as a set of relatively light-gauge electric conductors, connected with the auxiliary power terminal means; the auxiliary power conduction means being routed, at least in part, alongside the main power conduction means to a set of auxiliary power utilization points within or near the building;

(d) signal conduction means, such as an optical fiber means, connected with the signal terminal means; the signal conduction means being routed alongside the main power conduction means and/or alongside the auxiliary power conduction means to a set of signal utilization points within or near the building;

(e) a main power utilization means, such as an electric lighting fixture, connected with the main power conduction means at a first of said main utilization points and operative to be powered by unconditioned power provided therefrom;

(f) an auxiliary power utilization means, such as a telephone instrument having a feature whereby the mere lifting of its receiver causes the automatic dialing of a pre-programmed telephone number, connected with the auxiliary power conduction means at a first of said auxiliary utilization points and operative to be powered by conditioned power received therefrom;

(g) a first signal utilization means, such as a computer terminal and/or a telephone instrument, connected with the signal conduction means at a first of said signal utilization points and operative thereby to communicate with said external communications facility; and (h) a second signal utilization means, such as a first wireless transceiver means, connected with the signal conduction means at a second of said signal utilization points and operative thereby to communicate with said external communications facility as well as with a second wireless transceiver means located in the vicinity of the first wireless transceiver means.

DESCRIPTION OF AN INITIAL RELATED EMBODIMENT

Details of Construction of Initial Related Embodiment

Figure 1:
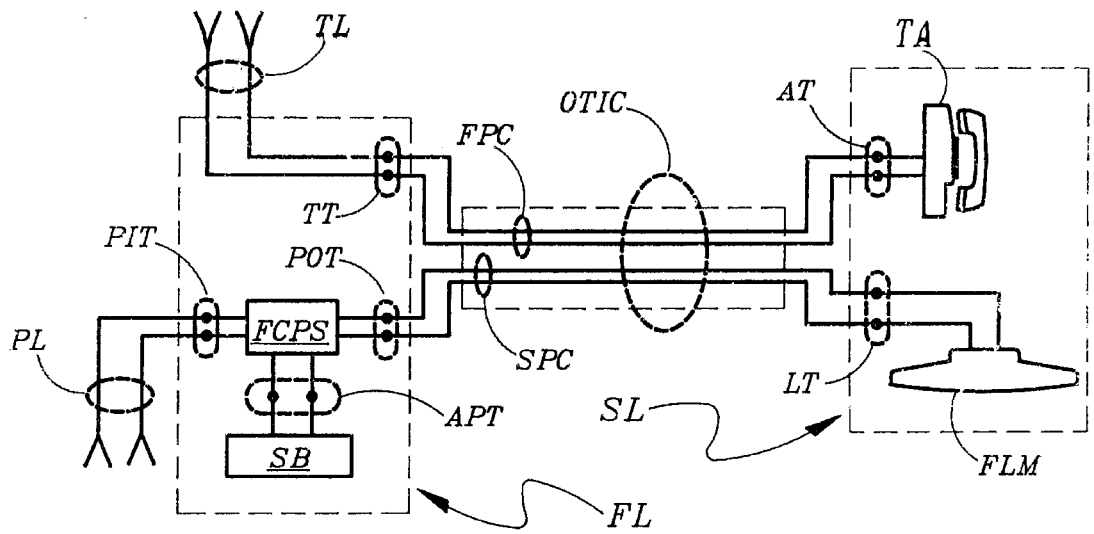
FIG. 1 provides an overall schematic view of an embodiment of an initial invention related to the present invention.

FIG. 1 illustrates the overall arrangement of an initial embodiment related to the present invention.

In FIG. 1, a telephone line TL and a power line PL both come into a first location FL and connect with a pair of telephone terminals TT and a pair of power input terminals PIT, respectively.

A frequency-converting power supply FCPS is connected with power input terminals PIT, and provides its output at power output terminals POT. A storage battery SB is connected with frequency-converting power supply FCPS by way of a pair of auxiliary power terminals APT.

At a second location SL, a telephone apparatus has a pair of apparatus terminals AT; and a fluorescent lighting means FLM has a pair of lighting terminals LT.

An ordinary telephone installation cable OTIC has a first pair of conductors FPC and a second pair of conductors SPC. The first pair of conductors is connected between telephone terminals TT and apparatus terminals AT; and the second pair of conductors is connected between power output terminals POT and lighting terminals LT.

Figure 2:
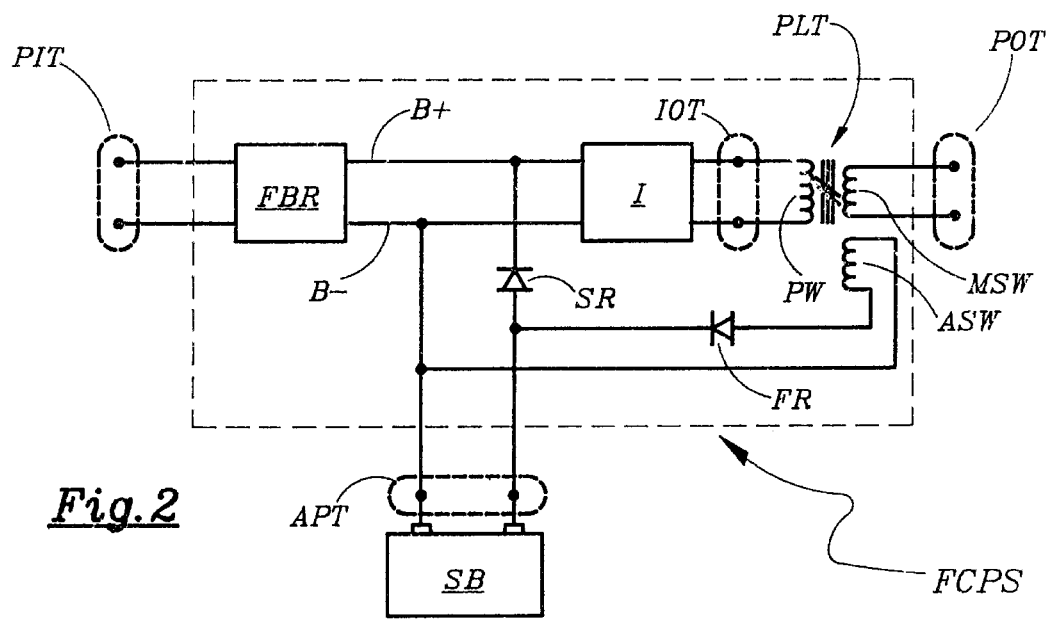
FIG. 2 provides details in respect to the frequency-converting power supply used in the embodiment of FIG. 1.

FIG. 2 provides details of frequency-converting power supply FCPS and its relationship with storage battery SB.

In FIG. 2, a full bridge rectifier FBR is connected with power input terminals PIT and provides its rectified output voltage between a B+ bus and a B− bus. An inverter I is connected with the B+ bus and the B− bus, and provides an AC voltage at inverter output terminals IOT. A power-limiting transformer PLT has a primary winding PW connected across inverter output terminals IOT, a main secondary winding MSW connected with power output terminals POT, and an auxiliary secondary winding ASW connected between the B− bus and the anode of a first rectifier FR, whose cathode is connected with the anode of a second rectifier SR. The cathode of second rectifier SR is connected with the B+ bus.

Auxiliary power terminals APT are connected with the negative and positive terminals of storage battery SB in such manner that the negative terminal connects with the B− bus and the positive terminal connects with the anode of second rectifier SR.

Figure 3:
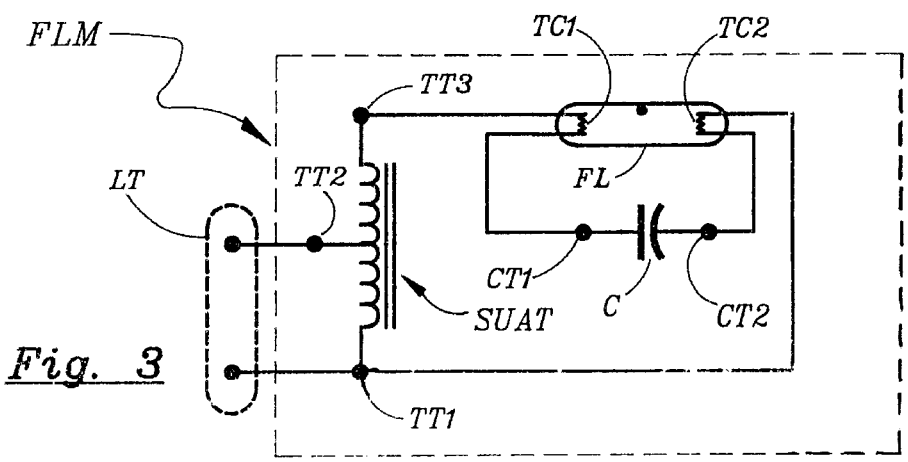
FIG. 3 provides details in respect to the fluorescent lighting means used in the embodiment of FIG. 1.

FIG. 3 provides details of fluorescent lighting means FLM.

In FIG. 3, a step-up auto-transformer SUAT has three transformer terminals TT1, TT2 and TT3. Transformer terminals TT1 and TT2 are connected with lighting terminals LT. Transformer terminal TT3 is connected with a first capacitor terminal CT1 of a capacitor C by way of a first thermionic cathode TC1 of a fluorescent lamp FL. A second capacitor terminal CT2 of capacitor C is connected with transformer terminal TT1 by way of a second thermionic cathode TC2 of fluorescent lamp FL.

Details of Operation of Initial Related Embodiment

With reference to FIGS. 1–3, the operation of the initial related embodiment may be explained as follows.

With frequency-converting power supply FCPS connected with an ordinary 120 Volt/60 Hz power line, a 30 kHz squarewave voltage is provided at inverter output terminals IOT.

The output provided at power output terminals POT is also a 30 kHz voltage. However, due to internal magnetic leakage between primary and secondary windings in power-limiting transformer PLT, the maximum amount of current available from the POT terminals is manifestly and non-dissipatively limited. In particular, the output from the POT terminals is inductively limited in such manner as to meet the specifications in the National Electrical Code for Class-2 electrical circuits.

The output from the POT terminals is connected with a pair of conductors (SPC) in the more-or-less ordinary telephone installation cable OTIC. The telephone line is also connected with a pair of conductors (FPC) in cable OTIC. Thus, both Class-2 electric power as well as ordinary telephone signals are transmitted between the first location (FL) and the second location (SL) by way of an ordinary telephone installation cable (OTIC).

The first location would typically be some central location within a building; and the second location would typically be a telephone booth located some distance away from this building. However, the two locations might also both be located within a single building.

As long as the frequency-converting power supply (FCPS) is being powered by power line voltage from the power line (PL), the storage battery (SB) is being charged from the auxiliary secondary winding (ASW) on the power-limiting transformer (PLT). In the event of power failure, the inverter (I) will be powered from the storage battery; the voltage on which has a magnitude about half that existing between the B+ bus and the B− bus whenever power line voltage is present. Whenever the inverter is being powered by the storage battery, the magnitude of the voltage provided by the ASW winding is too low to cause battery charging.

The 30 Volt/30 kHz voltage provided by the FCPS power supply is transmitted to the fluorescent lighting means (FLM) in the second location (SL), thereby to provide illumination as might be useful in connection with using the telephone apparatus (TA).

In the fluorescent lighting means (FLM), the step-up auto-transformer (SUAT) receives the 30 Volt/30 kHz inductively current-limited voltage from the POT terminals of the FCPS power supply and transforms it to a 100 Volt/30 kHz inductively current-limited voltage. In combination with capacitor C, this 100 Volt/30 kHz inductively current-limited voltage is appropriate for starting and powering the fluorescent lamp (FL) by way of series-resonant action.

Additional Comments Regarding Initial Related Embodiment (a) For further details in respect to frequency-converting power supplies and series-resonant ballasting circuits for fluorescent lamps, reference is made to U.S. Pat. No. Re. 31,758 to Nilssen and U.S. Pat. No. 3,710,177 to Ward.

(b) The series-resonant ballasting circuit described by Ward is especially suitable for powering a fluorescent lamp over a wide range of different driving voltage magnitudes. In particular, reducing the driving voltage magnitude by a factor of two, reduces the lamp light output by less than a factor of two.

(c) If it should happen that the distance between the first location (FL) and the second location (SL) is more than about 100 feet, it is advantageous to reduce the frequency of the driving voltage provided by the frequency-converting power supply (FCPS). In particular, for very large distances, it is anticipated that frequencies as low as 1 kHz may be used.

(d) The maximum amount of power available from the power output terminals (POT) of the frequency-converting power supply (FCPS) is 100 Watt; which is the maximum amount permissible for Class-2 electrical circuits in accordance with the National Electrical Code.

(e) It is expected that, in addition to use in connection with telephone booths and the like, the combined telephone and distribution system of FIG. 1 will find use in homes, offices, and the like; and that both telephone signals and Class-2 electric power will be available by way of ordinary telephone-type receptacle means. In particular, it is anticipated that the output from the frequency-converting power supply (FCPS) be provided at the point in a building from which the telephone signals are distributed, thereby to provide for both telephone signals as well as Class-2 electric power to be distributed by way of a common ordinary multi-conductor telephone cable to multiple locations within the building: typically to the locations where telephone instruments are located.

(f) The National Electrical Code is established by National Fire Protection Association, Batterymarch Park, Quincy, Mass. 02269. Its presently most up-to-date version is provided in a book entitled NATIONAL ELECTRICAL CODE 1984; which book is published by National Fire Protection Association. By reference, this book in general, and Article 725 thereof in particular, is herewith made part of this patent specification.

(g) Article 725 of the National Electrical Code deals with power-limited circuits; which power-limited circuits are designated Class-1, Class-2, and Class-3 circuits.

Class-2 circuits refer to electrical circuits wherein: i) the maximum voltage available from or within the circuit is low enough in magnitude to be substantially free from electrical shock hazard to a person coming in direct electrical contact with terminals and/or other elements of the circuit, and ii) the maximum power available from or within the circuit is low enough to be substantially free of fire initiation hazard in case of an electrical malfunction, such as a short circuit.

Class-3 circuits refer to electrical circuits wherein: i) the maximum magnitude of any voltage available from or within the circuit is not higher than 150 Volt, and ii) the maximum power available from or within the circuit is low enough to be substantially free of fire initiation hazard in case of an electrical malfunction, such as a short circuit.

Under most conditions, the continuously available Volt-Ampere product from a Class-2 or Class-3 electrical circuit must be limited to a maximum of 100 Volt-Ampere; which means that the power available is correspondingy limited to a maximum of 100 Watt.

(h) The output from the frequency-converting power supply (FCPS) of FIGS. 1 and 2 is limited in accordance with the specifications in the NATIONAL ELECTRICAL CODE 1984 for Class-2 circuits; which means that it also complies with the specifications for Class-3 electrical circuits. Thus, under most conditions, the Volt-Ampere product available from the POT terminals of the FCPS power supply on a continuous basis may be as high as, but will not exceed, 100 Volt-Ampere.

As indicated in FIG. 2, limitation of Volt-Ampere product output is attained by providing for manifest magnitude-limitation on available output current; which manifest magnitude-limitation is attained by providing for less than 100% coupling between primary winding PW and main secondary winding MSW on power-limiting transformer PLT. Thus, current magnitude-limitation is attained by non-resistive or non-dissipative means.

(i) It is anticipated that glass or optical fiber means may be used instead of ordinary electrical conductors for providing telephone signal transmission between the first location (FL) and the second location (SL); in which case the OTIC cable of FIG. 1 would consist of optical fiber means in combination with electrical conductor means.

Thus, alternatively, the pair of lines labeled FPC in FIG. 1 represent an optical fiber means.

(j) The amount of power provided to the fluorescent lighting means (FLM) of FIGS. 1 and 3, is about 40 Watt.

Thus, the amount of power transmitted by way of the electric power transmission path (namely the SPC conductors of FIG. 1) is on the order of many Watt. On the other hand, the amount of power transmitted by way of the telephone transmission path (namely the FPC conductors of FIG. 1) is only on the order of a small fraction of one Watt.

(k) To minimize power losses and/or to permit longer transmission distances, it is anticipated that the SPC conductors of the OTIC cable be made of two or more parallel-connected pairs of the multiple individual conductors present in an ordinary telephone installation cable, or—alternatively—be made of heavier gauge conductors.

(l) In addition to, or instead of, the fluorescent lighting means (FLM) in FIG. 1, other electric power utilization means may be employed.

Similarly, in addition to, or instead of, the telephone apparatus (TA) of FIG. 1, other telephone signal utilization means may be employed.

For instance, the second location (SL) may harbor a computer terminal connected with the telephone signal transmission means (namely the FPC condustors) as well as with the electric power transmission means (namely the SPC conductors). That way, information transfer may take place by way of the telephone signal transmission means, and Class-2 electrical power transmission for operation of the computer terminal may be provided by way of the electric power transmission means.

(m) A telephone utility signal line is herewith defined as that set of electrical conductors, fiber optic means, or radio link means, used for transmitting telephone and/or similar signals between the location of a telephone company's facility and the location of a telephone customer.

(n) The amount of electric power available from a telephone utility signal line is on the order of milli-watts.

(o) The amount of electric power available from an ordinary electric power line in a home or office, as by way of an ordinary electric wall receptacle means, is on the order of kilo-watts.

(p) There is no inherent reason for the magnitude of the power transmitted along-side the telephone utility signal line be limited to 100 Watt. Clearly, by providing for other means for fire-initiation protection, larger amounts of power may safely be provided.

(q) It is emphasized that the telephone utility signal line may be used for communications relative to the power being provided therealongside. Thus, for instance, a signal may be generated indicating the magnitude of the current being drawn by the load (or each load); and this signal may be transmitted to the source of power and used to compare the magnitude of the current drawn by the load versus the magnitude of the current being provided from the source. Then, if there be any substantive difference therebetween, potential fire hazard may be indicated (as from an unauthorized load, such as a partial short circuit); and protective measures—such as circuit interruption—could be implemented.

(r) A basic concept herein disclosed in that of transmitting conditioned electric power alongside a telephone utility signal line, thereby to provide for a substantive amount of electric power at or near the point of utilization of the telephone signal. A corollary concept is that of transmitting information alongside a power transmission line; in which case information can be transmitted back relative to the utilization of the electric power. In either case, however, because of the immense ratio in magnitude difference between the power level associated with the electric power transmitted and the power level associated with the information signal transmitted, a high degree of separation is needed between the signal transmitting means and the power transmitting means. Consequently, due to the immense differences in transmission frequencies, to attain a high degree of electromagnetic separation, a fiber optic line would be a particularly suitable signal communication means to be used alongside a power transmitting line.

DESCRIPTION OF ANOTHER RELATED EMBODIMENT

Details of Construction of the Other Related Embodiment

Figure 4A:
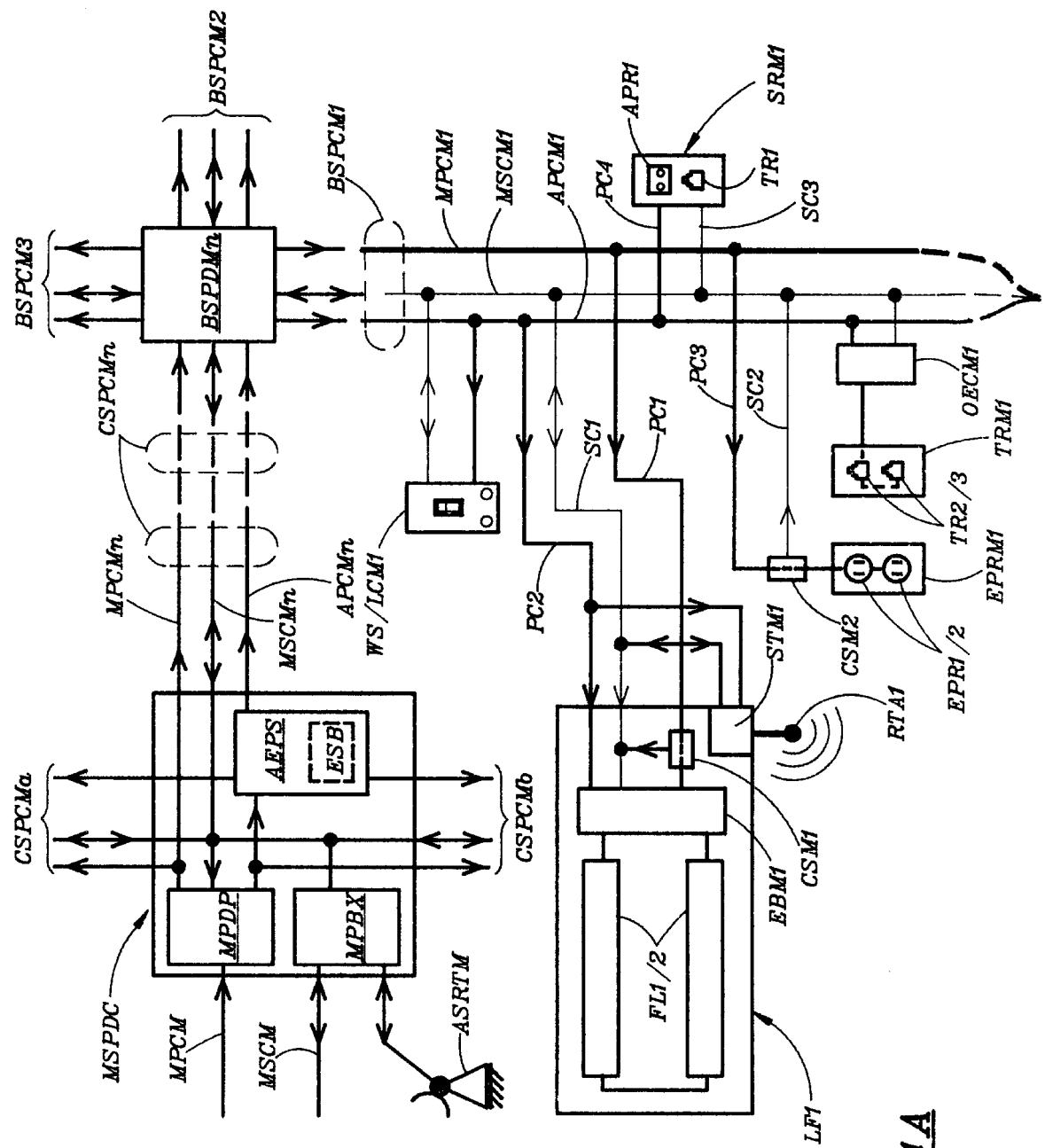
FIG. 4 schematically illustrates an embodiment of another invention related to the present invention.
Figure 4B:
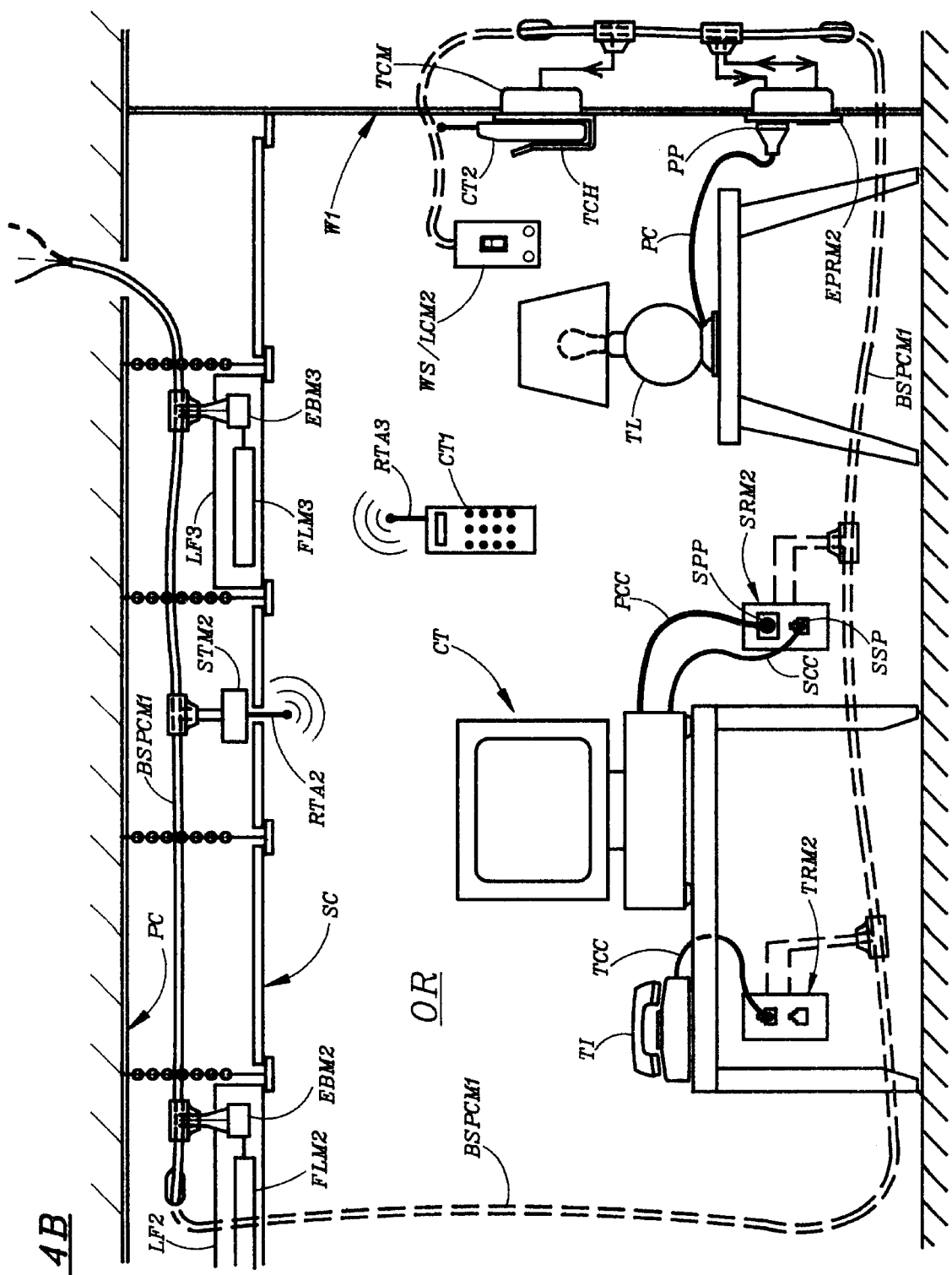

FIG. 4 schematically illustrates the systems aspect of the other related embodiment. In FIG. 4, power from a local electric utility company is provided via main power conducting means MPCM (which may consist of two or more conductors transmitting single or multi-phase power) to main power distribution panel MPDP of main signal and power distribution center MSPDC. Main signal conducting means MSCM provides for signal transmission between a main private branch exchange MPBX and the local telephone utility company. Also connected with main private branch exchange MPBX is an external auxiliary signal receiving and transmitting means ASRTM; which might be a so-called microwave link.

Connected with main power distribution panel MPDP is an auxiliary electric power source AEPS; which includes an electric storage battery ESB.

Several sets of combined signal/power conducting means, CSPCMa, CSPCMb, and CSPCMn, are connected with main signal and power distribution center MSPDC. Each of these sets has a main power conducting means (ex: MPCMn) connected with main power distribution panel MPDP, a main signal conducting means (ex: SCMn) connected with main private branch exchange MPBX, and an auxiliary power conducting means (ex: APCMn) connected with auxiliary electric power source AEPS.

Combined signal/power conducting means CSPCMn connects with a branch signal/power distribution means BSPDMn; which, in turn, is connected with plural sets of branch signal/power conducting means BSPCM1, BSPCM2 and BSPCM3. Branch signal/power conducting means BSPCM1 comprises main power conducting means MPCM1, main signal conducting means MSCM1 and auxiliary power conducting means APCM1. Branch signal/power conducting means BSPCM1 then connects with various signal and/or power utilization and/or control means, as follows.

A wall switch and light control means WS/LCM1 is connected with main signal conducting means MSCM1 and auxiliary power conducting means APCM1.

A lighting fixture LF1 has two fluorescent lamps FL1/2 which are series-connected across the output of an electronic ballasting means EBM1; which is connected with: (i) main power conducting means MPCM1 via power conductor PC1, which runs through current sensing means CSM1; (ii) main signal conducting means MSCM1 via signal conductor SC1, which is connected with current sensing means CSM1; and (iii) auxiliary power conducting means APCM1 via power conductor PC2.

A signal transceiver means STM1, which is incorporated into lighting fixture LF1, is connected with power conductor PC2 and signal conductor SC1. It has a receive/transmit antenna RTA1 projecting out from the body of the lighting fixture.

An electric power receptacle means EPRM1 is connected with main power conducting means MPCM1 via a power conductor PC3; which power conductor PC3 runs through a current sensor means CSM2; which current sensor means, in turn, is connected with main signal conducting means MSCM1 via a signal conductor SC2. Electric power receptacle means EPRM1 has electric power receptacles EPR1/2; each of which is operative to receive and hold an ordinary electric power plug.

A special receptacle means SRM1 is connected with auxiliary power conducting means APCM1 and main signal conducting means MSCM1 via power conductor PC4 and signal conductor SC3, respectively. Special receptacle means SRM1 has an auxiliary power receptacle APR1 and a telephone receptacle TR1.

A telephone receptacle means TRM1 is connected with main signal conducting means MSCM1 via an optoelectronic converter means OECM1; which, in turn, is connected with auxiliary power conducting means APCM1. Telephone receptacle means TRM1 has two telephone receptacles TR2/3; each of which is operative to receive and hold an ordinary telephone plug.

A suspended ceiling SC is suspended below a permanent ceiling PC, and branch power/signal conducting means BSPCM1 is located in the space between. Below the suspended ceiling is an office/room OR.

Mounted in the suspended ceiling are lighting fixtures LF2 and LF3, which comprise fluorescent lighting means FLM2 and FLM3 as well as electronic ballasting means EBM2 and EBM3, all respectively. Electronic ballasting means EBM2 and EBM3 are each connected with main power conducting means MPCM1, main signal conducting means MSCM1, and auxiliary power conducting means APCM1 of branch signal/power conducting means BSPCM1.

Also mounted in the suspended ceiling is a signal transceiver means STM2, which has a receive/transmit antenna RTA2 protruding into office/room OR. Signal transceiver means is connected with main signal conducting means MSCM1 as well as auxiliary power conducting means APCM1 of branch signal/power conducting means BSPCM1.

Located somewhere in office/room OR is a cordless telephone CT1 with a receive/transmit antenna RTA3; and positioned into a telephone charger-holder TCH, which is mounted on a wall W1, is a cordless telephone CT2. Telephone charger-holder TCH includes a telephone charging means TCM, which is connected with auxiliary power conducting means APCM1 of branch signal/power conducting means BSPCM1.

An electric power receptacle means EPRM2 is connected with main power conducting means MPCM1 as well as with main signal conducting means MSCM1 of branch signal/power conducting means BSPCM1. A table lamp TL has a power cord PC with a power plug PP plugged into electric power receptacle means EPRM2.

A wall switch and light control means WS/LCM2 is connected with main signal conducting means MSCM1 and auxiliary power conducting means APCM1 of branch signal/power conducting means BSPCM1.

A computer terminal CT has a signal connection cord SCC and a power connection cord PCC having, respectively, a special signal plug SSP and a special power plug SPP. These two plugs are plugged into a special receptacle means SRM2; which, in turn, is connected with main signal conducting means MSCM1 and auxiliary power conducting means APCM1 of branch signal/power conducting means BSPCM1.

A telephone instrument TI is connected via a telephone connect cord TCC with a telephone receptacle of a telephone receptacle means TRM2; which, in turn, is connected with main signal conducting means MSCM1 and auxiliary power conducting means APCM1 of branch signal/power conducting means BSPCM1.

Figures 5, 6:
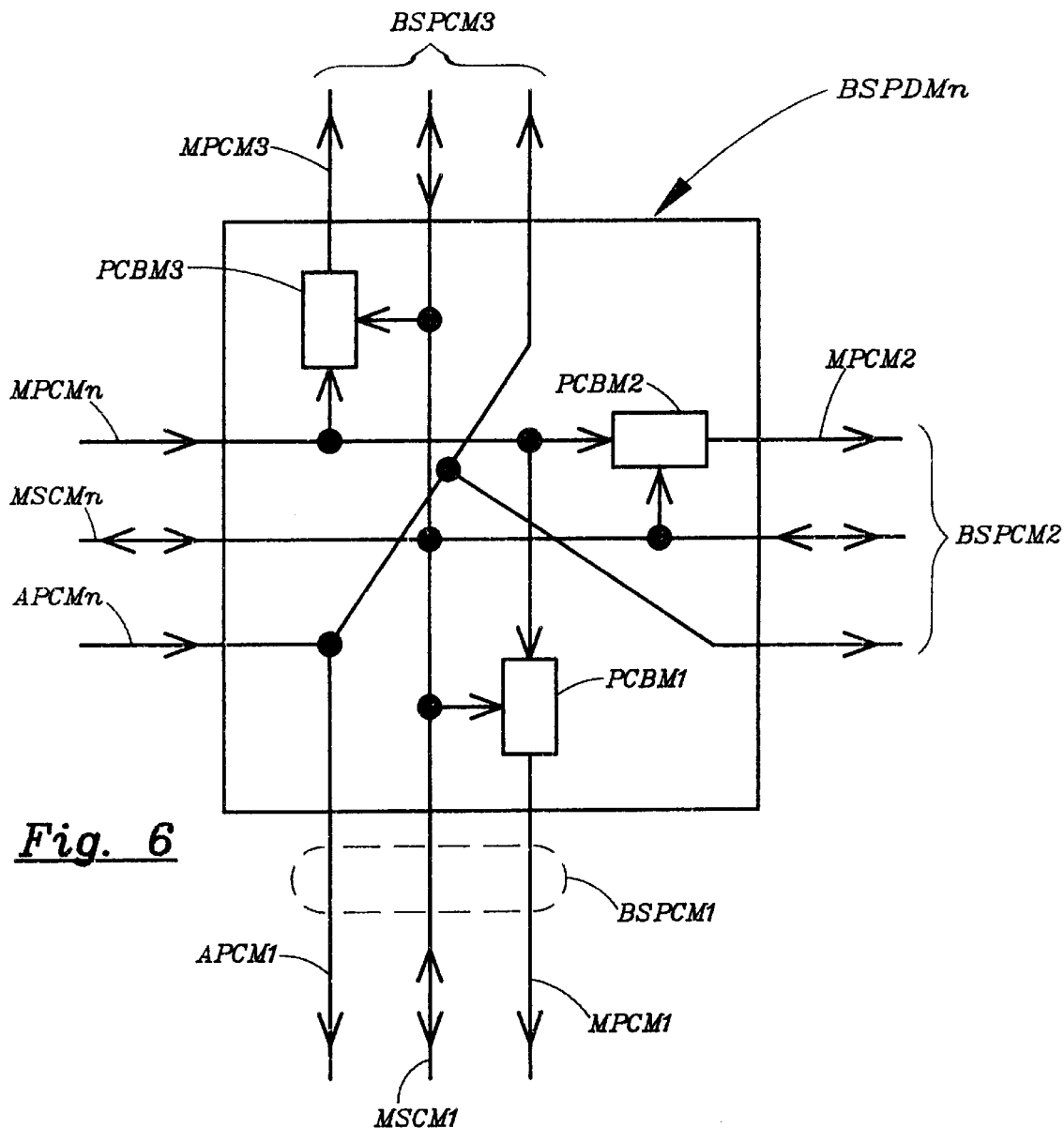
FIG. 5 shows a section of the combined main power, auxiliary power, and signal conduction means of the FIG. 4 arrangement.
FIG. 6 shows details near a branch point of the combined power and signal distribution system of FIG. 4.

FIG. 5 shows a cross-section of a branch signal/power conducting means BSPCM (such as BSPCM1), particularly indicating a pair of main power conductors MPC1 and MPC2, a pair of auxiliary power conductors APC1 and APC2, and an optical signal conductor OSC.

FIG. 6 shows key details of branch signal/power distribution means BSPDMn, particularly indicating that main power conductor means MPCMn connects with main power conducting means MPCM1 by way of a programmable circuit breaker means PCBM1; which programmable circuit breaker means is connected with main signal conducting means MSCM1. Otherwise, auxiliary power conducting means APCMn is shown to be directly connected with auxiliary power conducting means APCM1, and main signal conducting means MSCMn is shown to be directly connected with main signal conducting means MSCM1. Main power conducting means MPCM2 and MPCM3 connect with main power conducting means MPCM by way of programmable circuit breaker means PCBM2 and PCBM3, respectively.

Figure 7:
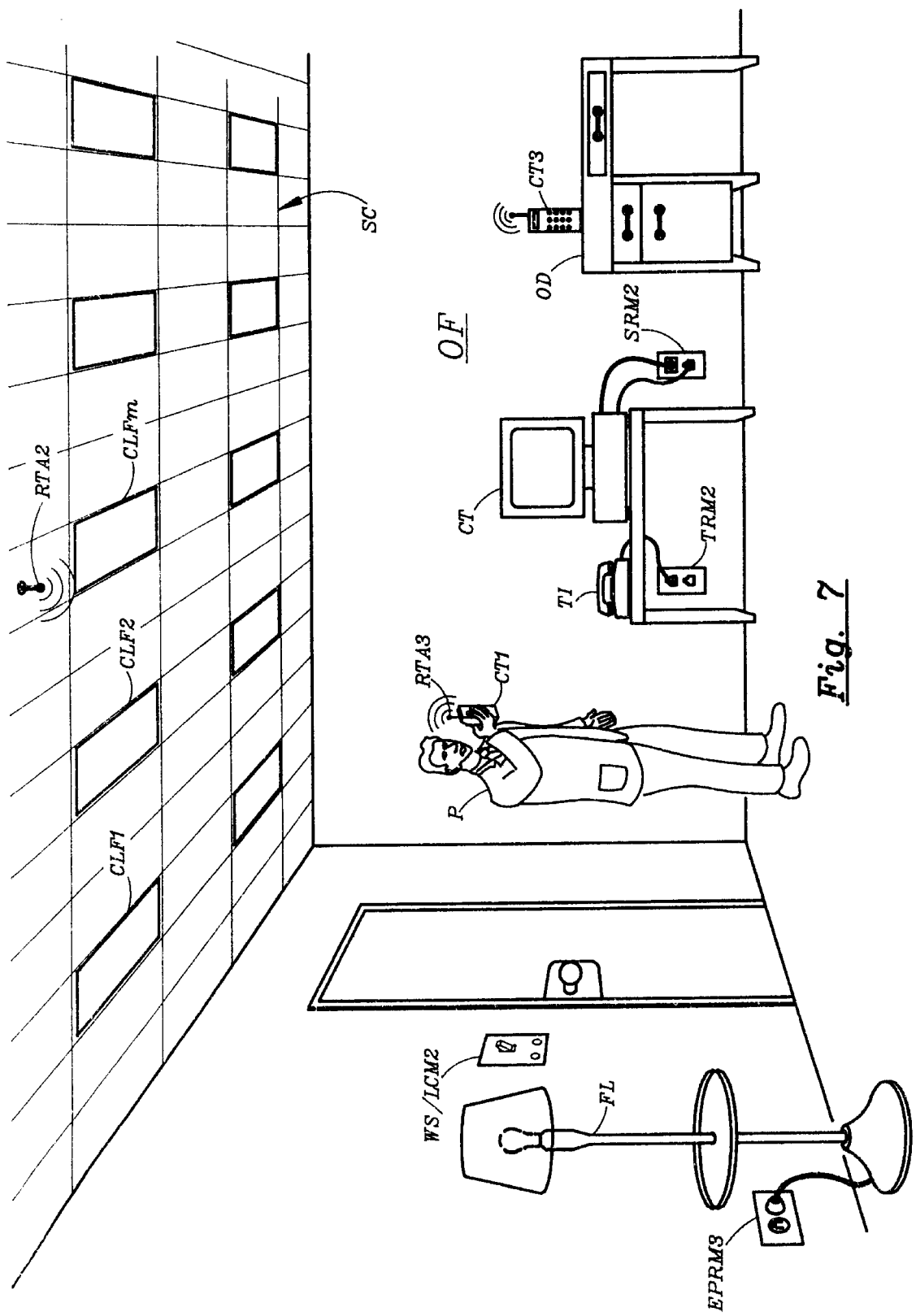
FIG. 7 shows key features of the other related invention by way of a perspective view of plural rooms in a building having a power and signal distribution system such as the one of FIG. 4.

FIG. 7, in a perspective view, illustrates how the system of FIG. 4 might appear in an office OF in which a person P is holding cordless telephone CT1 with receive/transmit antenna RTA3; which connects via wireless means with receive/transmit antenna RTA2; which connects with signal transceiver means STM2 (located above suspended ceiling SC, as in FIG. 4) and which protrudes from the ceiling into office OF.

Otherwise, the office has numerous ceiling lighting fixtures CLF1, CLF2 . . . CLFm; which are controlled from wall switch and light control means WS/LCM2. Another cordless telephone CT3 is shown standing on an office desk OD; computer terminal CT is shown to connect with special receptacle means SRM; telephone instrument TI is shown connected with telephone receptacle means TRM2; and electric power receptacle means EPRM3 is shown powering a floor lamp FL.

Details of Operation of the Other Related Embodiment

In the combined signal and power distribution system of FIG. 4, at the main signal and power distribution center (MSPDC), electric power from the local electric utility is received at main power distribution panel MPDP via main power conducting means MPCM. The main signal conducting means (MSCM) provides for connection between the local telephone company and the main private branch exchange (MPBX); which is also connected with the auxiliary signal receive/transmit means (ASRTM) via which telephone and other signals are interchanged with some remotely located wireless receive/transmit means (not shown).

Within the main signal/power distribution center (MSPDC), the auxiliary electric power source (AEPS), which is connected with and powered from the main power distribution panel (MPDP), provides conditioned electric power to its three separate outputs, one of which is connected with auxiliary power distribution means AEPDMn. This conditioned electric power is similar to the unconditioned electric power received from the local electric utility company, except that it continues to be provided even during periods where delivery of electric power from the local electric utility company is interrupted; during which periods the conditioned electric power is derived from the electric storage battery (ESB) by way of a voltage conditioner means; which storage battery is charged by power derived from the local electric utility company during periods other than those associated with interruption in power delivery therefrom.

From the main signal/power distribution center, main electric power from the main power distribution panel as well as auxiliary electric power from the auxiliary electric power source are distributed to plural branch signal/power distribution means, such as via common signal/power conducting means CSPCMn to branch signal/power distribution means BSPDMn. Also, the various branch signal/power distribution means (such as BSPDMn) are each connected with the main signal/power distribution center (MSPDC) via a main signal conducting means (such as MSCMn).

From each branch signal/power distribution means (ex: BSPDMn), main electric power is distributed to its associated main power conducting means (ex: MPCM1) via a programmable circuit breaker means (ex: PCBM1). This programmable circuit breaker means is operative to interrupt the flow of power in its associated main power conducting means (ex: MPCM1) in response to information received via main signal conducting means MSCM; which carries the same information signals as do the other main signal conducting means (ex: MSCM1).

More particularly, using PCBM1 as an example, the programmable circuit breaker means operates as follows: (i) it senses the magnitude of the current flowing through it (i.e., the current delivered to its associated main power conducting means MPCM1) and derives an internal electrical measure for that magnitude; (ii) it receives information via the main signal conducting means (MSCM1) with respect to the magnitude of the current drawn by each of the loads connected with its associated main power conducting means (MPCM1); (iii) it compares its own measure of the current flowing through it with the sum of the magnitudes of the currents drawn by the various loads connected to its associated main power conducting means (MPCM1); and (iv) if the result of this comparison shows that more current is flowing through circuit breaker means PCBM1 than is accounted-for by the various loads powered through it, it acts to interrupt the flow of current to its associated main power conducting means. Thus, if an unauthorized load (such as an accidental short circuit) were to be connected with a given main power conducting means (ex: MPCM1), its associated programmable circuit breaker (PCBM1) would sense it and act to interrupt the supply of current to that given main power conducting means.

In other words, each of the various loads (ex: lighting fixture LF1) properly connected with a given main power conducting means (MPCM1) draws its power via a current sensing means (CSM1); which current sensing means is connected to a nearby main signal conducting means (MSCM1) and, via this signal conducting means, transmits information to the associated programmable circuit breaker means (PCBM1) with respect to the magnitude of the current flowing through it, thereby to provide to the associated programmable circuit breaker means information with respect to the (instantaneous) magnitude of each individual one of the various loads properly connected with the associated main power conducting means.

As a consequence of providing-for the above-indicated auditing and control of the current provided to the various loads served via a given programmable circuit breaker means, there is much reduced need for protecting the main power conducting means by mechanical armor, such as steel conduit. This is so for the reason that the above-described system prevents any substantial amount of power from being dissipated by way of an unauthorized load. Thus, an accidental short circuit of a main power conducting means is effectively prevented from constituting a fire initiation hazard.

In effect, except to the degree that power is being extracted via a proper current sensing means (ex: CSM1), each main power conducting means may be considered as a so-called Class-3 electrical circuit (which, according to the definitions of the National Electric Code, means that the maximum power available from it on a continuous basis must not exceed 100 Watt) and therefore substantially safe from fire initiation hazard.

Clearly, to meet the specifications of Class-3 electrical circuits, the sensitivity of each programmable circuit breaker means should be such as to act to interrupt the flow of current at some point before unauthorized power drain exceeds 100 Watt.

In subject combined signal and electric power distribution system, power is delivered to plural lighting fixtures (ex: LF1) mounted in a suspended ceiling (SC). Each of these lighting fixtures is connected both with its nearby main power conducting means (MPCM1) as well as with its nearby main signal conducting means (MSCM1); however, each of at least some of these lighting fixtures is also connected with its nearby auxiliary power conducting means. With respect to each of these latter lighting fixtures, the associated electronic ballasting means (ex: EBM1 in lighting fixture LF1) is so designed and constructed as to be operative to be powered from its associated auxiliary power conducting means (APCM1) during periods when the supply of power from its associated main power conducting means (MPCM1) is interrupted, thereby to continue to provide light output even during periods of main power failure.

Also, in at least some of the lighting fixtures, the ballasting means is so designed and constructed as to be able to receive instructions in the form of signals from from its associated main signal conducting means and to adjust the level of its light output in accordance with those instructions. More particularly, via a central switch and control means (ex: WS/LCM1), at least some of the lighting fixtures may be switched ON and OFF, as well as having its light output level adjusted, by way of signals transmitted from this central switch and control means to these lighting fixtures by way of the main signal conducting means.

Otherwise, power is delivered on a continuous basis from the auxiliary electric power source (AEPS), via the auxiliary power conducting means (such as via APCM1), to various loads for which power interruption would be particularly disadvantageous, such as computers (ex: CT) and telephone instruments (ex: TI). Although not shown (for the purpose avoiding unnecessary complexities in the drawings), the delivery of electric power via the various auxiliary power conducting means is also audited and controlled in the same manner as is the delivery of power via the various main power distributing means. Otherwise, for purposes of safety from fire initiation, it would be necessary to distribute the auxiliary electric power in mechanically armored conduits.

In attaining the above-identified functions, the main signal conducting means is required to handle numerous different signals at the same time: transmitting such signals back and/or forth between any two or more of numerous spaced-apart locations along the signal conducting means.

Several different techniques permit the substantially simultaneous transmission of numerous different signals along a single signal conducting means (such as an optical fiber), thereby effectively making this single signal conducting means provide-for a plurality of separate and independent communication channels. However, in instant situation, it is necessary not only to provide for such a plurality of separate communication channels, but it is also necessary to make any number of these channels accessible at any one or more locations along the signal conducting means.

In this other related embodiment, the above-indicated features are attained via a time-multiplexing technique combined with using an optical fiber as the signal conducting means; the operation of which combination is explained via simplified example, as follows.

In an optical fiber, a capacity of 100 separate broad-band signal channels are provided-for by dividing time into segments each having a duration of ten milli-seconds, and then by dividing each of these ten-milli-second-long time-segments into 100 time-slots, each having a duration of 100 micro-seconds. Thus, each individual communication channel is represented by a particular one of these hundred-micro-second-long time-slots, repeated once during each ten-milli-second-long time-segment; which is to say that each individual channel may be identified by a number (from 1 to 100) indicating what particular hundred-micro-second-long time-slot it constitutes within each ten-milli-second-long time-segment.

Still more particularly, each given one of the different current sensing means (ex: CSM1) includes electronic information processing means operative to convert the sensed magnitude of its through-flowing current into a commensurately digitally coded signal, and then to deliver this coded signal to the nearby main signal conducting means every ten milli-seconds during its designated hundred-micro-second-long time-slot. Thus, the information regarding the magnitude of the through-flowing current is updated once each ten milli-seconds; which is adequately frequent for most ordinary purposes. Each time after being delivered to the main signal conducting means, this coded signal courses along this main signal conducting means and, within a matter of less than a few micro-seconds after initial delivery, reaches the programmable circuit breaker means (PCBM1) associated with the particular main power conducting means (MPCM1) feeding current through the given one of the different current sensor means (i.e., CSM1).

This programmable circuit breaker means (PCBM1) has been pre-programmed to selectively receive whatever signal is provided during the hundred-micro-second-long time-slot designated to this particular given one of the different current sensor means (CSM1), as well as from each and every one of any other current sensor means (ex: CSM2) subject to current delivered from the particular main power conducting means (MPCM1) associated with this particular programmable circuit breaker means (PCBM1). As additional loads with additional current sensor means are added, the programming of the associated programmable circuit breaker means is correspondingly modified.

Within a given programmable circuit breaker means, the information received from the different associated current sensor means is processed such as to result in a single (digital) signal representing the sum of all the load currents flowing through all the different associated current sensor means; which sum signal is then compared with an internal (digital) signal representing the magnitude of the total current delivered through that given programmable circuit breaker means; which internal signal is derived from the output of a current sensor means built into the given programmable circuit breaker means and operative to sense the magnitude of the total current delivered therethrough. Then, if the comparison shows that the magnitude of the delivered current is larger than that of the sum of the individual load currents, the circuit breaker acts to interrupt the delivery of current.

With respect to the various wall switches and light control means (ex: WS/LCM1), the various remotely controllable electronic ballast means (ex: EBM1), the various telephone receptacle means (ex: TRM1), the various special receptacle means (ex: SRM1), the various signal transceiver means (ex: STM1), etc., each has one or more designated unique time-slots; and each can communicate via the main signal conducting means (ex: MSCM1) (by way of its associated unique time-slot) and thereby with each other as well as with the main private branch exchange (MPBX) as well as with the local telephone company and/or with the auxiliary signal receiving and transmitting means (ASRTM).

An ordinary telephone conversation can readily be carried-on over each one of the hundred-micro-second-long time-slots; which is to say: over each one of the 100 communication channels provided by the above-described time-multiplexing feature. To provide for this type of time-multiplexed telephone conversation, each telephone instrument (ex: TI or CT1) includes the following key elements and features.

(1) Each telephone instrument has a means for converting a continuous audio (or voice) signal into a stream of hundred-micro-second-long bursts of digitized information; which bursts are updated and repeated once each ten milli-seconds. In the preferred embodiment, this conversion is accomplished by: (i) converting the analog audio signal (via an analog-to-digital converter means) into a stream of digitized information with a clock rate of 100 kHz; MHz; (ii) dividing or segregating this stream of digitized information into ten-milli-second-long segments; (iii) directing each such segment into a stepping register clocked at 100 kHz, thereby absorbing that segment into this stepping register; (iv) increasing the clock rate of that stepping register to 10 MHz (after the complete ten-milli-second-long segment has been absorbed), thereby time-compressing each one of these ten-milli-second-long segments to a hundred-micro-second-long burst of "concentrated" digitized audio or voice signal; and (v) once each ten milli-seconds, providing such a burst (at some output terminal means) during a selected one of the 100 separate hundred-micro-second-long time-slots.

(2) Likewise, each telephone instrument has a digital-to-analog conversion means for converting the above-indicated stream of hundred-micro-second-long bursts of digitized information into a continuous voice signal; which process is accomplished in a manner that is completely analogous (in an obverse manner) to the above-described analog-to-digital conversion process.

(3) Also, each (of at least some) of the telephone instruments has a voice-scrambling means operative to make the digitized voice information non-decipherable except by way of a deciphering means having the appropriate algorithm for de-scrambling.

(4) Moreover, each telephone instrument has a means to connect with the main signal conducting means (ex: via MSCM1) (either via a telephone plug or via a wireless tranceiver means), and to enter its digitized voice information (in the form of the indicated repeated hundred-micro-second-long bursts) into any chosen one of the 100 separate communication channels (i.e., into any one of the 100 hundred-micro-second-long time-slots). Likewise, each telephone instrument has an obverse-analogous means to receive digitized voice information from any one of the 100 separate communication channels.

(5) Each one individual telephone instrument has a designated communication channel (i.e., a designated hundred-micro-second-long time-slot) via which it may be reached. When so initially reached by a signal from another telephone instrument, this signal conveys information with respect to the designated communication channel of the other telephone instrument (i.e., the equivalent of its extension number); which therefore permits the one telephone instrument to respond by automatically causing its digitized voice output to be entered into the main signal conducting means at the particular time-slot corresponding to that other telephone instrument's designated communication channel.

It is important to recognize that the length of the signal conducting means represents a factor that may affect the quality of this signal communication function. Thus, without making special provisions, the relatively simple above-described communication system and function will only operate properly as long as the length of the main signal conducting means is very short relative to the length of the wave-train associated with the hundred-micro-second-long burts of digitized information; which, with the speed of light being equal to 300,000 kilo-meters per second, means that the length of this wave-train is about 100,000 feet; which further means that the total length of the signal conducting means should not exceed about 1000 feet.

More particularly, with the communication signal traveling along its signal conductor means at about 300,000 km/sec, channel-to-channel interference may result when the transmission time between points amounts to a significant fraction of the duration of one of the hundred-micro-second-long time-slots.

On the other hand, by making each time-slot substantially shorter than 100 micro-seconds in duration, substantially more than 100 time-slots may be accommodated within each ten-milli-second-long time-segment; which, in turn, means that the total number of communication channels may be increased substantially. For instance, making each burst of digitized audio information have a duration of only one micro-second (i.e., making each time-slot only one micro-second long) would permit the signal conducting means to carry 10,000 independent communication channels versus only 100. However, except if making provisions of the type described hereinbelow, using one-micro-second-long time-slots would limit the permissible maximum length of the signal conducting means by a factor of 100 as compared with using hundred-micro-second-long time-slots.

Of course, if more than 100 communication channels were to be required, multiple signal distribution means could be provided for.

Otherwise, it is noted that main private branch exchange MPBX provides, by way of the optical fiber means, the master clock signal necessary to synchronize the operation of the various signal-generating and/or signal-utilizing means.

In situations where it is desirable to have substantially more than 100 separate communication channels and/or to operate over distances far in excess of 1000 feet, the following alternative embodiment is preferable: in which alternatively preferred embodiment each time-segment is only one milli-second long and each time-slot is only one micro-second long; which, in turn, means that a total of 1000 communication channels can be provided for by this alternatively preferred embodiment.

The alternatively preferred embodiment obviates the above-indicated potential channel-to-channel interference by: (i) having the signal conducting means (ex: MSCM1) comprise a looped optical fiber wherein one end of a continuous optical fiber (the start point) originates at the MPBX and the other end of the same continuous optical fiber (the end point) terminates at the MPBX; (ii) having the end point of this continuous optical fiber connected with its start point by way of an electronic digital delay and signal conditioning means (hereinafter referred-to simply as "delay means"); (iii) having the fiber-loop contained in the form of two separate optical fibers located adjacent one another within the main signal conducting means (with the far ends of the two optical fibers optically joined together at the far end of the signal conducting means); (iv) having each one of the various telephone instruments connected at one point in the fiber-loop; (v) having each telephone instrument so connected and arranged that it will enter its signals into the optical fiber in such manner that these signals will travel only in one direction toward the MPBX (which direction is hereinafter defined as "downstream", with the opposite direction being defined as "upstream"), while it will extract signals from the optical fiber as they come from the MPBX and/or from any other points upstream; (vi) having the delay means receive signals from the end point of the fiber-loop and, after a certain time delay, deliver the same signals at a reduced magnitude to the start point; and (viii) having this certain time delay being of such duration as to cause a signal having originated from a given telephone instrument to arrive back to this very same instrument exactly one milli-second later (at a reduced magnitude).

The reason for making the magnitude of the signals entered by the delay means (at the start point of the fiber-loop) substantially lower in magnitude than those signals the delay means receives from the fiber-loop (at its end point) relates to avoidance of potential interference; which potential interference and its avoidance arise as follows: (i) a given telephone instrument will, during each of its designated time-slots, send a freshly updated signal downstream along the optical fiber; (ii) this freshly updated signal will be entered by that given telephone instrument at its particular point of connection with the fiber-loop (i.e., point of entry) at the very time that its previously-entered signal reaches that very point of entry; (iii) by making the (freshly updated) signal then being entered far larger in magnitude than the previously-entered signal just then arriving, this previously-entered signal will in effect be erased (obliterated) by the currently-entered far-larger-in-magnitude signal. Then, as this far-larger-in-magnitude signal passes by other telephone instruments further downstream, or as it reaches the MPBX (i.e., the delay means), the associated downstream points of entry will only detect the most-recently-entered (freshly updated) signal.

Additional Comments Regarding Other Related Embodiments (r) Actually, the total number of useful communication channels in the above-described alternatively preferred embodiment will be less than 1000 by a number that is equal to the duration of an individual time-slot (i.e., one micro-second) divided into the total time delay associated with a signal traveling twice the distance to the telephone instrument located farthermost away from the MPBX. If that distance were to be 10,000 feet, the number of available communication channels would be 980 instead of 1000.

(s) A different approach to implementing the above-described alternatively preferred embodiment involves the use of two separate fiber-loops: one loop for receiving the signals entered by the various telephone instruments and for transmitting these signals downstream toward the MPBX; and one loop for receiving signals from the delay means to transmit these signals to the various telephone instruments. By so using two separate fiber-loops, there will be no need to require of each telephone instrument to receive a relatively weak signal and to emit a much stronger signal.

(t) In the above-described alternatively preferred embodiment, the analogue telephone signal has to be compressed into one-micro-second-long time-slots updated once each milli-second; which implies a degree of "time-compression" of 1000:1 versus only 100:1 for the time-compression associated with the basic preferred embodiment.

(u) A key recognition underlying the invention herein described relates to the fact that the overwhelming percentage of electric power distribution within a building is done for the purpose of lighting, especially so in commercial buildings. Thus, the lighting function becomes the chief determinant of where and how electric power conductors are distributed within a building. By further recognizing that a properly designed telephone signal distribution system can be installed as permanently as can the electric power distribution system without losing any of the required flexibility and that the signal distribution conductors can in fact be safely be laid down alongside the electric power conductors, it becomes clear that doing so provides for substantial overall benefits in the form of reduced installation cost, decreased complexity and increased flexibility.

In particular, the relatively heavy gauge electric power distribution conductors may be reduced in number and total lengths for two basic reasons: (i) load control (such as ON/OFF switching of lights) can be accomplished remotely from the load without actually stringing the electric power conductors to the point of control (i.e., to the wall switch); and (ii) due to increased protection against fire initiation hazards, it becomes feasible to distribute electric power via a single pair of heavy gauge distribution conductors as contrasted with distributing electric power via a multiplicity of pairs of distribution conductors all radiating out from a central power panel.

Thus, in sum total, instant invention relates to the proposition of distributing both electric power and communication signals along a single common main signal and electric power conducting means, branching off along the way from this common main signal and electric power conducting means at whatever points convenient. Thus, instant invention relates to providing in a building the equivalent of what for automobiles has become known as "a single wire power distribution system".

(v) It is anticipated that TV signals as well may be distributed via instant combined signal and electric power distribution system.

(w) As instant invention relates to a combined signal and electric power distribution system and various key features thereof, information on how to accomplish some of the details of these key features has been omitted for sake of brevity and clarity. However, based on the description provided, all the features indicated are readily attainable by a person having ordinary skill in the art pertinent hereto on basis of well known prior art.

For instance, such a person would readily know how to attain the functions associated with the signal transceiver means STM2 installed in suspended ceiling SC and connected with main signal conducting means MSCM1 and alternative power conducting means APCM1; which signal transceiver means is continuously transmitting and receiving on all of the communication channels provided by main signal conducting means MSCM1. Thus, as a person P comes into office OF carrying his own personal cord-less telephone CT1, he is—via receive/transmit antenna RTA2 and signal tranceiver means STM2—automatically (i.e., without taking any express log-in action) in contact with his own personally designated communication channel on main signal conducting means MSCM1.

(x) One of the key concepts underlying instant invention is that of using information transmission and processing for keeping accurate track of the flow of electric power, thereby to permit accurate control thereof. As a consequence, any substantive unauthorized power dissipations are detected and prevented, thereby providing for an exceptionally high degree of protection against electrical fire intiation hazards.

In fact, outside of the authorized points of power extraction (ex: lighting fixture LF1), the total power distribution system may be considered as a Class-3 electrical circuit.

DESCRIPTION OF A PREFERRED TELEPHONE INSTRUMENT

Details of Construction of the Preferred Telephone Instrument

Figure 8:
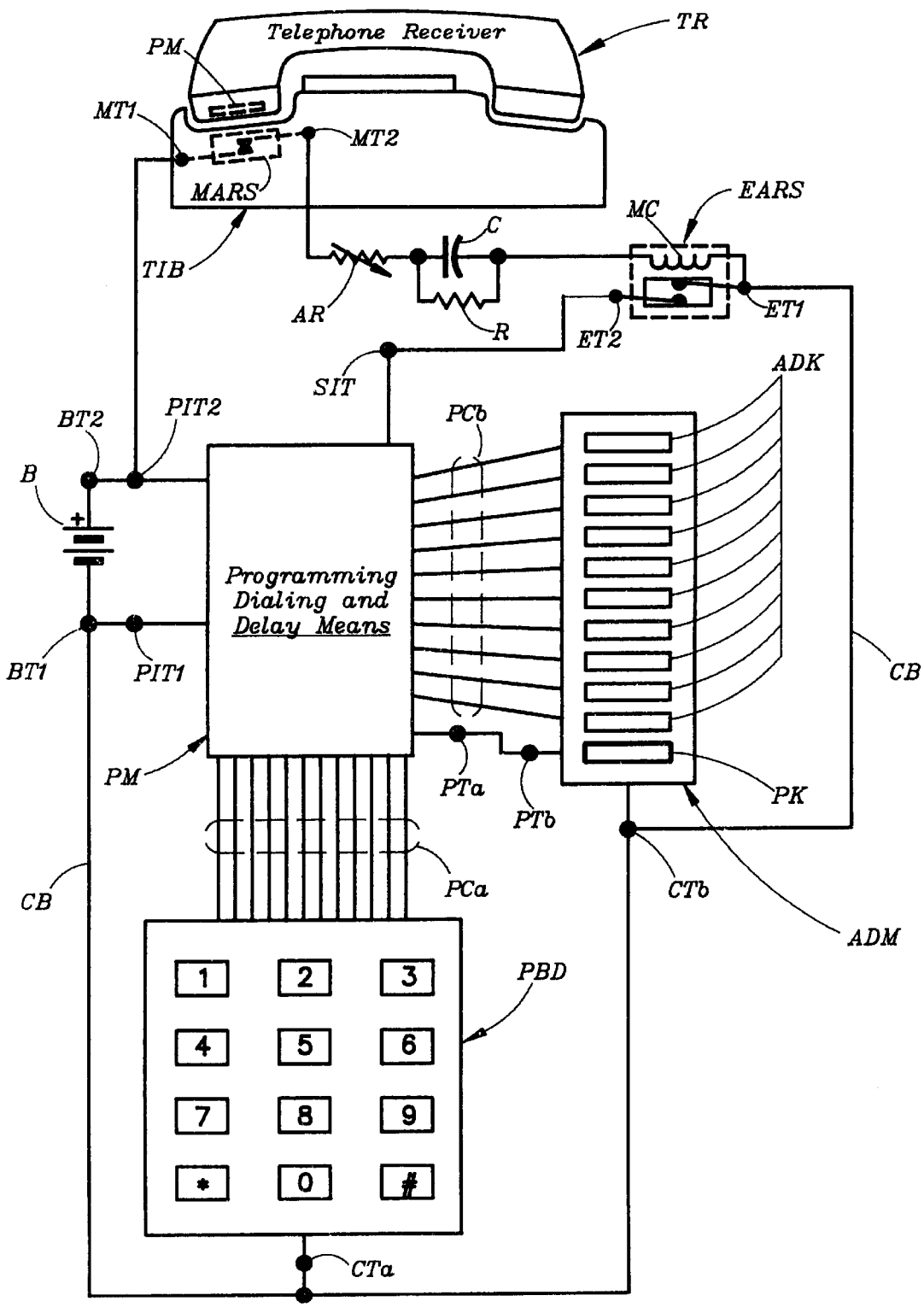
FIG. 8 illustrates a telephone instrument for use in the embodiment of FIG. 4.

FIG. 8 schematically illustrates the preferred embodiment of a telephone instrument for use in the power and signal distribution system of FIG. 4.

In FIG. 8, a telephone receiver TR is shown resting in its ordinary not-in-use position on a telephone instrument base TIB. Built into the ear piece (or, alternatively, into the mouth piece) of the telephone receiver is a permanent magnet PM, shown in phantom outline; which permanent magnet PM is aligned with a normally-closed magnetically-activated reed switch MARS, also shown in phantom outline, located in the telephone instrument base TIB directly underneath permanent magnet PM. Switch MARS has two switch terminals MT1 and MT2.

An ordinary push-button telephone dial is shown as PBD; which dial PBD has a common terminal CTa connected with a common bus CB, as well as plural output terminals each connected via plural conductors PCa with a corresponding input terminal of a programming, dialing and delay means PM.

Common bus CB is connected with a power input terminal POT1 of programming means PM as well as with battery terminal BT1 of a battery B, whose other battery terminal BT2 is connected with power input terminal PIT2 of programming means PM as well as with terminal MT1 of switch MARS. Common bus CB is also connected with common terminal CTb of an auxiliary dialing means ADM as well as with switch terminal ET1 of normally-open electrically-actuated reed switch EARS. Terminal ET1 is connected with terminal MT2 of switch MARS by way of magnetizing coil MC (contained within switch EARS), a parallel-combination of a capacitor C and a resistor R, and an adjustable resistor AR. The other switch terminal of switch EARS is designated ET2 and is connected with a special input terminal SIT of programming means PM.

Auxiliary dial means ADM has plural output terminals, each connected via plural conductors PCb with a corresponding input terminal of programming means PM.

Programming means PM has a program terminal PTa that is connected with a corresponding program terminal PTb on auxiliary dialing means ADM; which dialing means has a program key PK as well as plural automatic-dial keys ADK.

Details of Operation of the Preferred Telephone Instrument

The telephone arrangement illustrated in FIG. 8 functions as an ordinary push-button telephone having ordinary push-button dialing via push-button dial PBD as well as automatic dialing of plural pre-programmable telephone numbers via dial means ADM.

Of course, by way of connections and conductors not shown, programming means PM is connected in circuit with the electrical terminals of the telephone instrument represented by base TIB and receiver TR; which telephone instrument, in turn, is connected with an ordinary telephone line.

Aside from providing for the usual functions of manual and automative dialing of telephone numbers, programming means PM also provides for a function whereby—whenever its special input terminal SIT is activated—it will cause a certain special (pre-programmable) telephone number to be dialed, but only after a brief time-delay, such as about two seconds.

Activation of special input terminal SIT occurs whenever reed switch EARS momentarily closes. The momentary closing of reed switch EARS occurs each time telephone receiver TR is removed from its usual not-in-use position. More particularly, by action of permanent magnet PM, whenever telephone receiver TR rests in its ordinary not-in-use position, reed switch MARS is actuated and therefore exists in the state of being an open circuit (i.e., reed switch MARS is then open). However, as soon as telephone receiver TR is lifted from its ordinary not-in-use position, reed switch MARS reverts to its normal non-actuated state, which is that of being a short circuit (i.e., reed switch MARS is then closed). Upon closing of reed switch MARS, the battery voltage from battery B will be applied across the magnetizing coil MC of reed switch EARS, which therefore will become actuated. Thereafter, reed switch EARS will remain actuated until capacitor C reaches a certain state of charge, at which point reed switch EARS will again become non-actuated. The time period required for capacitor C to reach this certain state of charge is determined by capacitance of C as well as by the internal resistance of magnetizing coil MC as added-to the resistance of adjustable resistor AR.

Once telephone receiver TR is placed back into its ordinary not-in-use position, reed switch MARS again gets activated thereby opening the connection between magnetizing coil MC and battery B. From that point in time, the charge on capacitor C will drain away via resistor R, thereby to be ready to cause momentary activation of reed switch EARS at some later time when telephone receiver TR is again lifted.

A person would use the telephone instrument of FIG. 8 in the following manner.

(1) By merely removing the telephone receiver from its usual not-in-use position, after a delay of about two seconds, a certain pre-programmed (partial or complete) telephone number will automatically be dialed; thereby providing the function of totally automatic dialing of this certain telephone number; which certain telephone number could be an emergency telephone number, or it could be a very-frequently-dialed telephone number, or it could be a common part or pre-fix of some frequently-dialed telephone numbers (such as the three-digit pre-fix number in a given local calling area).

(2) In case the certain pre-programmed telephone number is only a partial telephone number (such as a pre-fix), all that is necessary for the person to do—after having lifted the receiver—is to complete the dialing of the desired telephone number by keying-in the additional numerals on the regular push-button dial (PBD).

(3) In case the person wishes to reach some other telephone number (i.e., other than the desired telephone number), he merely proceeds to dial that other telephone number, either by pressing one of the pre-programmed automatic-dial keys (ADK) within the two second delay period, or by keying-in that other telephone number in a regular manner via the regular push-button dial (PBD), starting this dialing procedure before the end of the two second delay period.

(4) To program the certain (partial or complete) telephone number into the programming means (PM), it is necessary to leave the telephone receiver in its usual not-in-use position and then, in chronological order, to: (i) momentarily press programming key PK; (ii) key-in the partial or complete telephone number on the keys of the regular push-button dial (PBD); and (iii) again press programming key PK.

(5) To program some other (partial or complete) telephone number into the programming means (PM), it is necessary to leave the telephone receiver in its usual not-in-use position and then, in chronological order, to: (i) momentarily press programming key PK; (ii) momentarily press one of the plural automatic dial keys (ADK); (iii) key-in the partial of complete telephone number on the keys of the regular push-button dial (PBD); and (iv) again press programming key PK.

Additional Comments Regarding Preferred Telephone Instrument (y) In FIG. 8, many of the details of the telephone instrument of FIG. 8 have been omitted for the reasons that: (i) they form no part of the present invention; and (ii) to a person having ordinary skill in the art pertinent hereto, they represent obvious subject matter and would, if included, merely hinder the ready understanding of the present invention.

(z) Instead of using battery B for powering programming means PM and/or for powering reed switch EARS, DC voltage available from the telephone line may be used.

Moreover, the function attained by way of the permanent magnet (PM) and the reed switches (MARS, EARS) may instead be provided by utilizing the signal and/or voltage that becomes available within an ordinary telephone instrument (connected with an ordinary telephone line) whenever the telephone receiver is removed from its ordinary not-in-use position.

DESCRIPTION OF PREFERRED CORDLESS-CELLULAR TELEPHONE SYSTEM

A preferred embodiment of the cordless-cellular telephone system is described and explained via FIGS. 9 through 17.

Details of Construction

Figure 9:
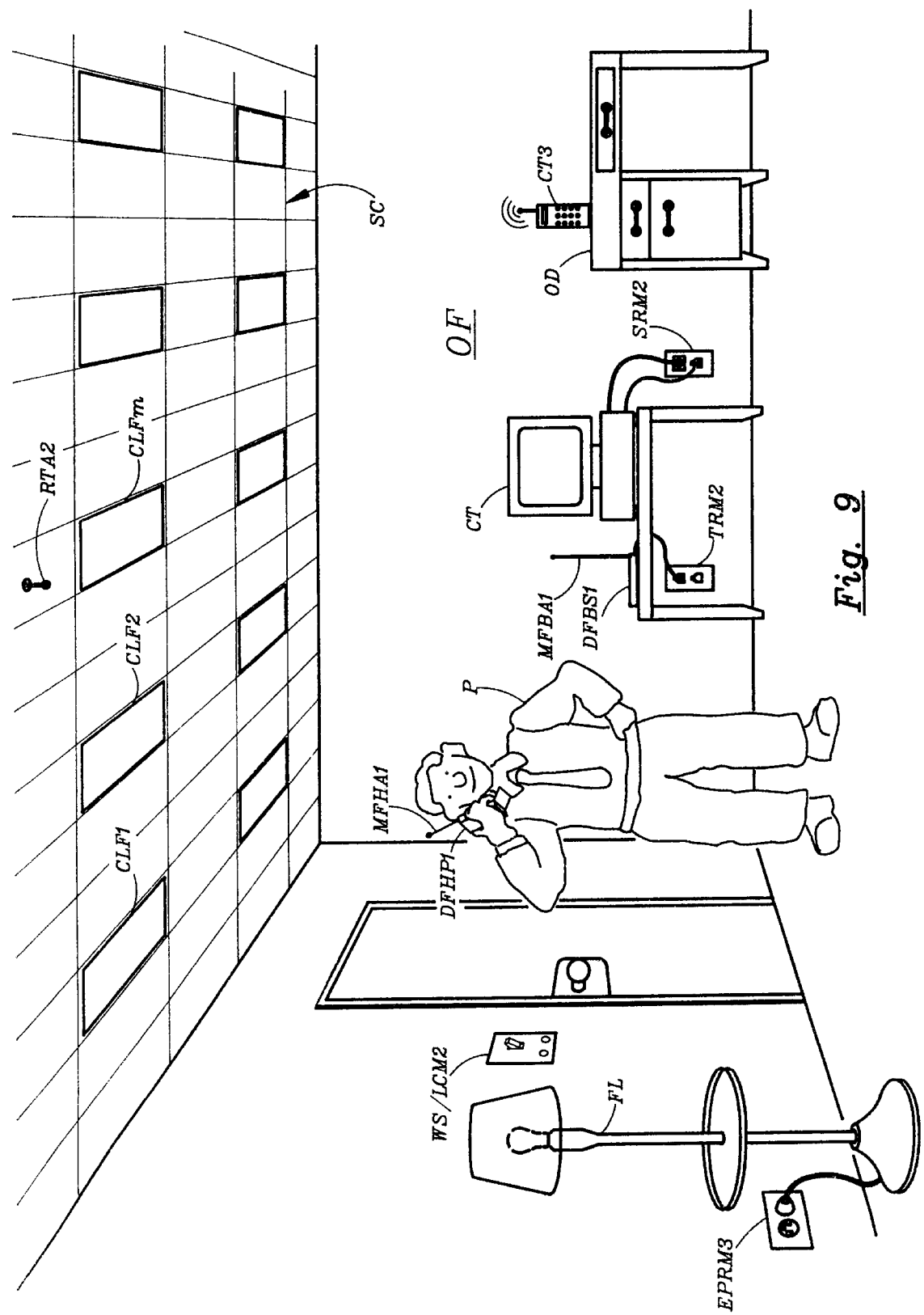
FIG. 9 illustrates the present invention by showing in an office a dual-function base-station with a dual-function cordless hand-piece in active use by a person.

FIG. 9 shows an arrangement identical to that of FIG. 7 except for having replaced telephone instrument TI and cordless telephone CT1 with a dual-function base station DFBS1 and a dual-function hand-piece DFHP1, respectively. Base station DFBS1 has a multi-function base antenna MFBA1; and dual-function hand-piece DFHP1, which person P holds near an ear in an active-use-position, has a multi-function hand-piece antenna MFHA1.

Figure 10:
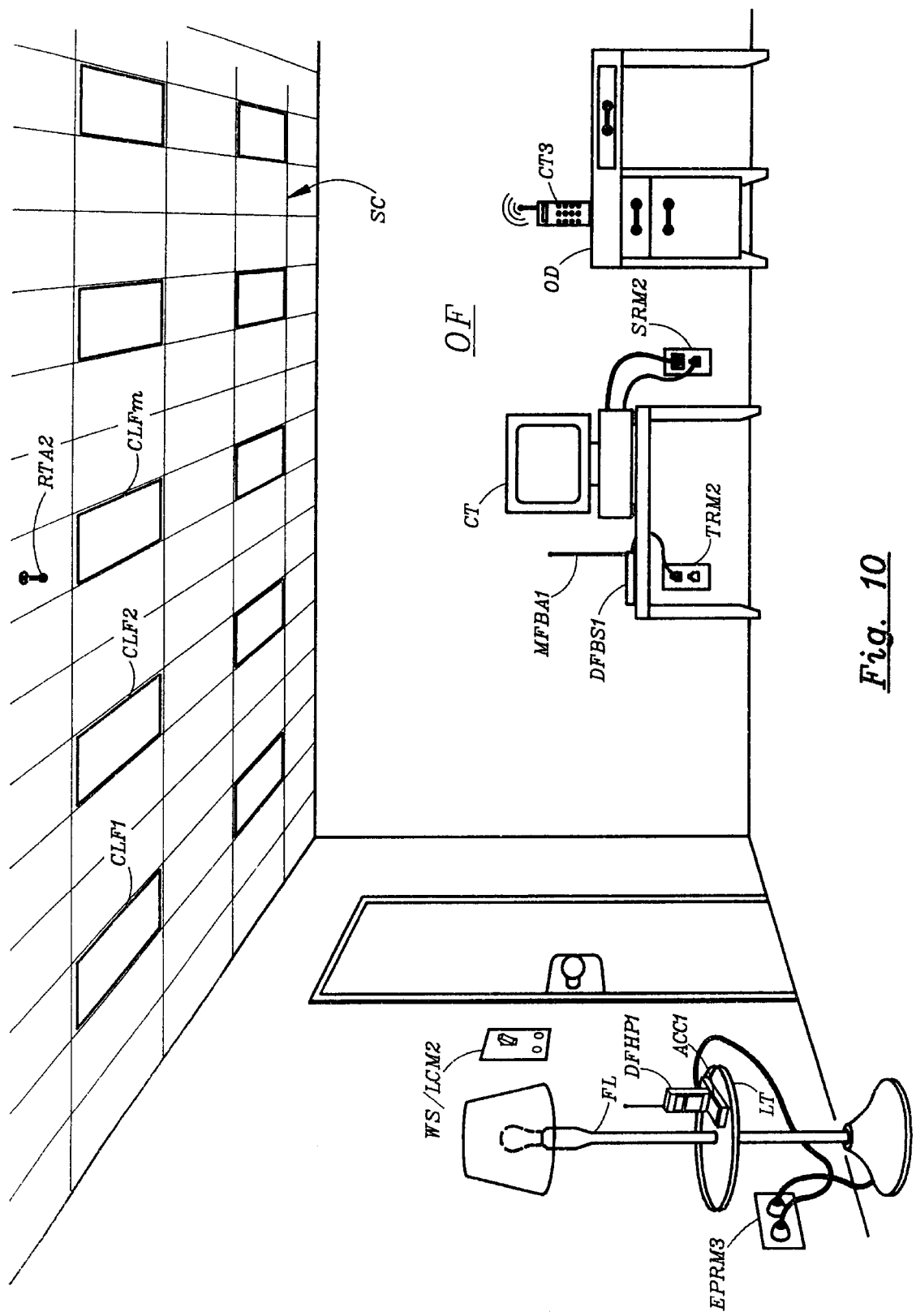
FIG. 10 illustrates the dual-function base-station with the dual-function cordless hand-piece located within cordless range, but otherwise not in use.

FIG. 10 illustrates an arrangement identical to that of FIG. 9, except that person P has left his office OF and placed his dual-function hand-piece DFHP1 in an auxiliary charging cradle ACC1 located on a lamp-table LT associated with floor lamp FL.

Figure 11:
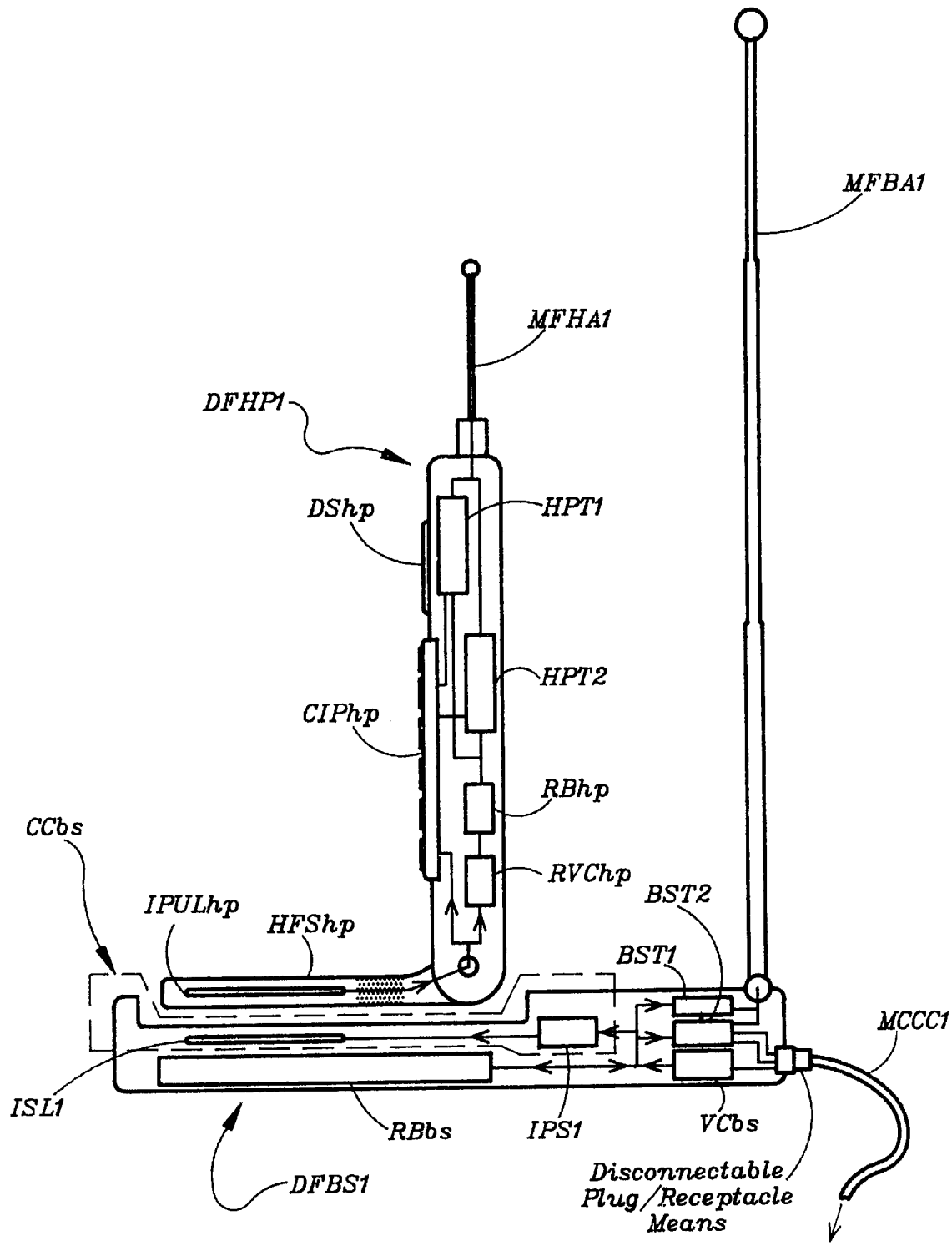
FIG. 11 represents a pseudo-cross-sectional view of the dual-function base-station of FIG. 9 with the dual-function cordless hand-piece cradled therein.

FIG. 11 provides a pseudo-cross-sectional view of dual-function base station DFBS1 and dual-function hand-piece DFHP1. In FIG. 11, hand-piece DFHP1 is shown resting in a charging cradle CCbs built into base-station DFBS1.

Hand-piece DFHP1 includes a first hand-piece transceiver HPT1 and a second hand-piece transceiver HPT2; which transceivers are both connected with multi-function hand-piece antenna MFHA1.

In hand-piece DFHP1, each of transceivers HPT1 and HPT2 is connected with a rechargeable battery RBhp; which battery RBhp is connected with a rectifying voltage conditioner RVChp; which, in turn, is connected with (and, at least at times, receives power from) inductive pick-up loop IPULhp disposed within a hinged flip-stand HFShp. Furthermore, hand-piece DFHP1 has a control interface-panel CIPhp with a display screen DShp; which control interface-panel CIPhp is connected with transceivers HPT1 and HPT2.

Base-station DFBS1 includes a first base-stand transceiver BST1 and a second base-stand transceiver BST2; which transceivers are both connected with multi-function base-station antenna MFBA1.

In base-station DFBS1, each of transceivers BST1 and BST2 is connected with multi-function antenna MFBA1 as well as with rechargeable battery RBbs; which rechargeable battery RBbs is connected with voltage-conditioner VCbs; which voltage-conditioner VCbs is, in turn, connected with (and powered from) a source of outside power (such as an ordinary household electric power receptacle) via multi-conductor connect-cord MCCC1. Transceiver BST1 is connected with a first telephone-utility line (such as provided at an ordinary home telephone receptacle) by way of multi-conductor connect cord MCCC1; and transceiver BST2 is connected with a second telephone-utility line by way of multi-conductor connect cord MCCC1.

In dual-function base-station DFBS1, an inverter-type power supply IPS1 is connected with rechargeable battery RBbs as well as with inductive supply loop ISL1.

Dual-function hand-piece DFHP1 is shown resting—by way of its hinged flip-stand HFShp—in charging cradle CCbs of base-station DFBS1 in such manner that inductive pick-up loop IPULhp is parallel-aligned with inductive supply loop ISL1.

Figure 12:
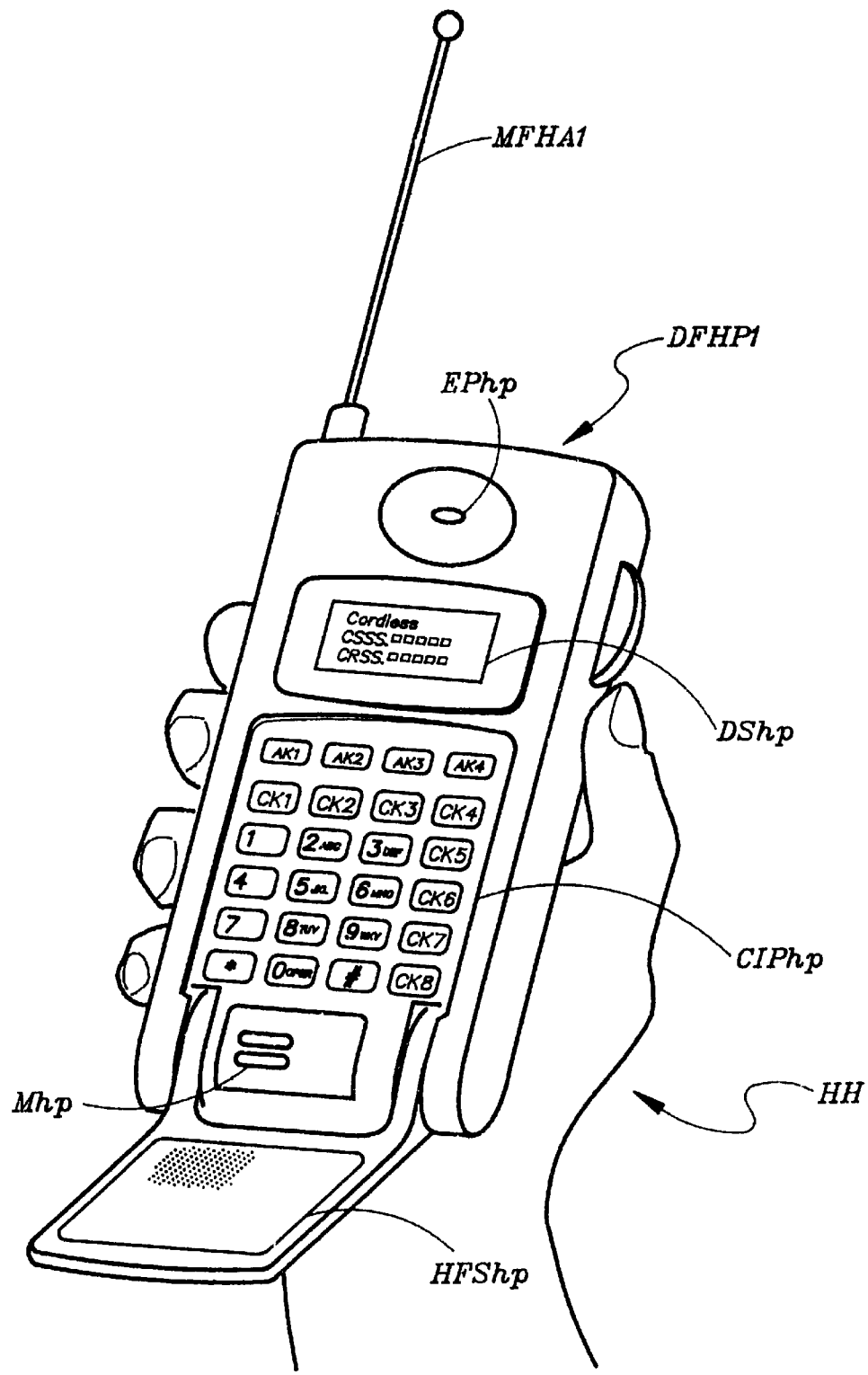
FIG. 12 illustrates the dual-function cordless hand-piece of FIG. 9 in further detail.

FIG. 12 illustrates multi-function hand-piece MFHP1 as held by a human hand HH.

In FIG. 12, display screen DShp is shown as displaying which particular mode (Cordless) of the three alternatively available modes (Cordless, Cellular, Dual) in which it happens to be functioning at the moment. In addition, the display screen is shown displaying the signal strength CSSS of the nearest cordless base station as well as the signal strength CRSS of the nearest cellular base station.

Otherwise, dual-function hand-piece DFHP1 is indicated to have an ear-piece EPhp, a microphone Mhp, as well as the regular complement of telephone dialing keys.

In addition to the regular complement of dialing keys, control interface-panel CIPhp has control keys CK1 through CK8 in addition to auxiliary keys AK1 through AK4.

Figure 13:
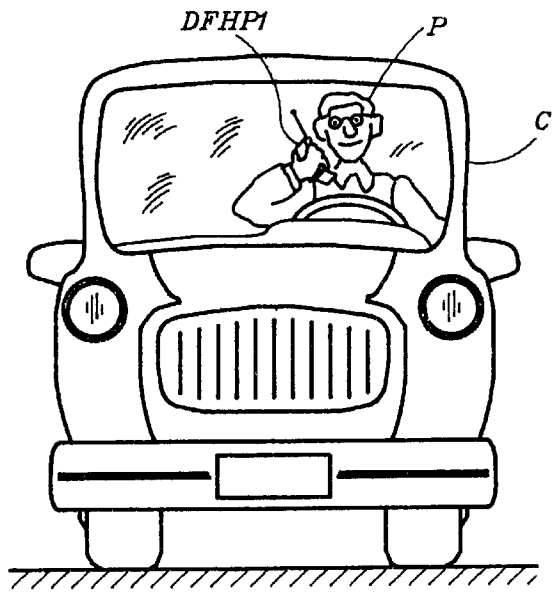
FIG. 13 illustrates the dual-function cordless hand-piece in a situation of having been moved beyond the cordless range of its in-office base-station and having thereby effectively been converted into an ordinary cellular telephone.

FIG. 13 shows person P in a car C with dual-function handpiece DFHP1 held to his ear.

Figure 14:
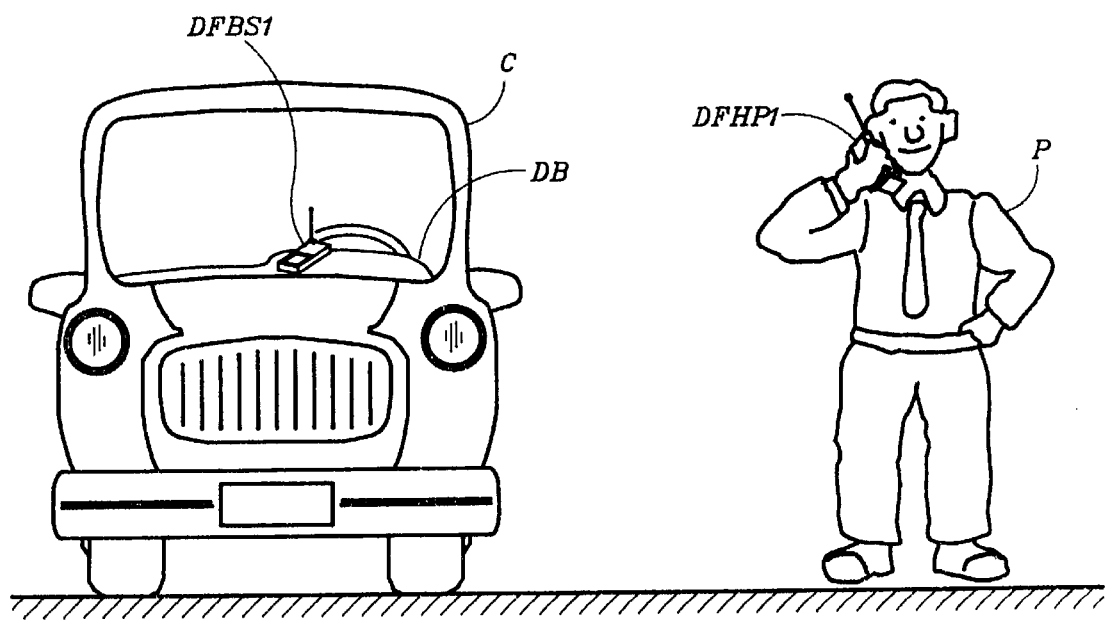
FIG. 14 shows the dual-function base-station disconnected from its power and signal supply cord, thereby operating as a portable battery-powered relay between the cordless hand-piece and the cellular telephone system.

FIG. 14 shows dual-function base-station DFBS1 standing on the dashboard DB of car C, with person P standing some distance away from car C while holding dual-function hand-piece DFHP1.

Figure 15:
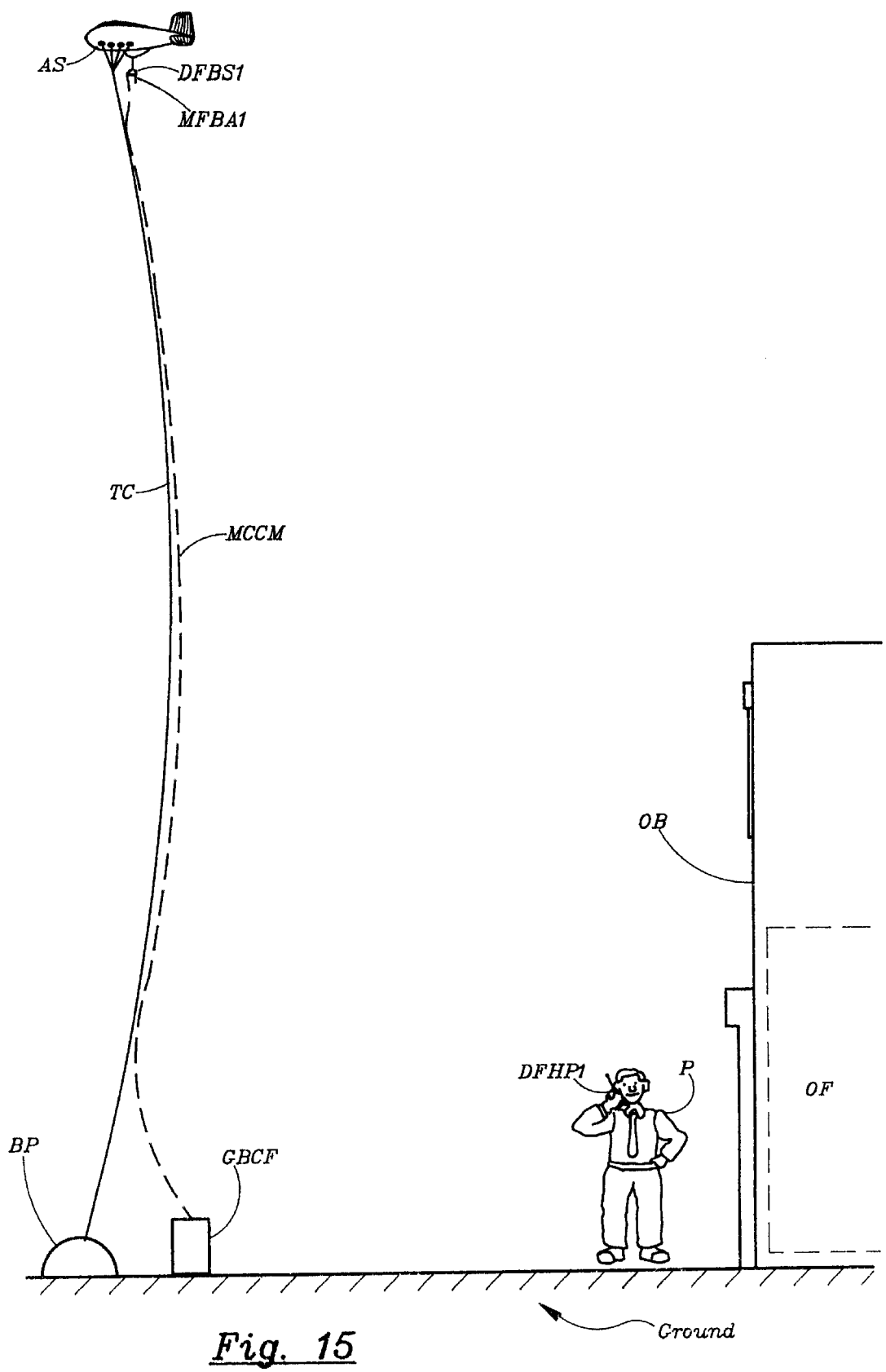
FIG. 15 illustrates an arrangement wherein a dual-function base-station is placed in a tethered aerostat.

FIG. 15 shows an aerostat AS tethered by way of a tether-cord TC to a base point BP. Hanging under aerostat AS is dual-function base-station DFBS1 with multi-function base-antenna MFBA1. Dual-function base-station DFBS1 is connected—via multi-conductor cord means MCCM running along tether-cord TC—to a ground-based connection facility GBCF connected in circuit with more-or-less regular electric utility power lines and telephone utility telephone lines. Also shown in FIG. 15 is person P standing on the ground next to an office building OB holding dual-function hand-piece DFHP1. In a pseudo-cross-sectional manner, office OF (from FIG. 10) is shown to exist within office building OB.

Figure 16:
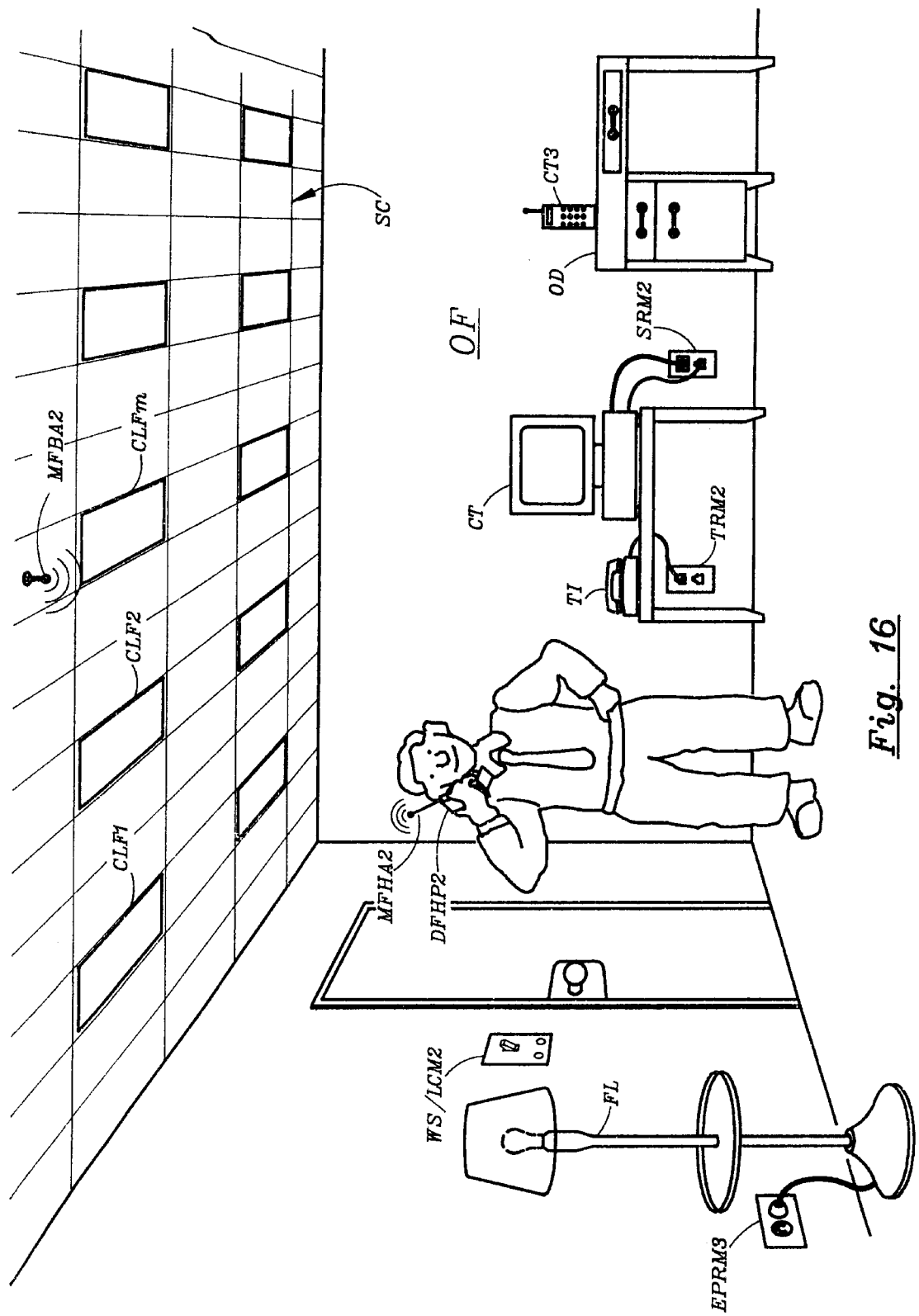
FIG. 16 illustrates an arrangement wherein a dual-function cordless hand-piece is combined with an intra-office micro-cellular telephone system.

FIG. 16 shows person P holding a dual-function hand-piece DFHP2 having a multi-function hand-piece antenna MFHA2; which hand-piece DFHP2 is connected in a wireless manner with multi-function base-antenna MFBA2 positioned in suspended ceiling SC.

Figure 17:
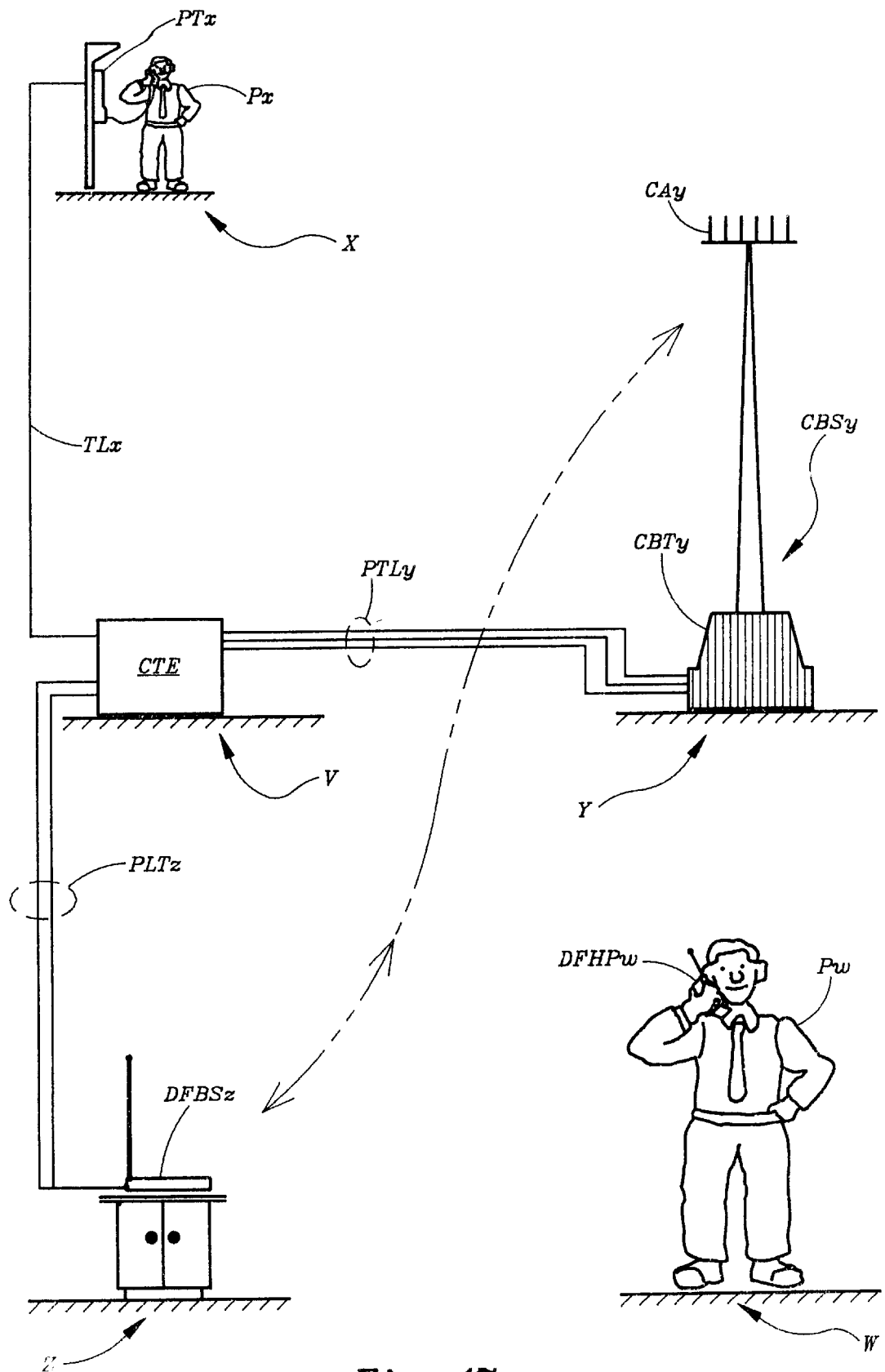
FIG. 17 provides an overview of a preferred embodiment of the combined cordless-cellular telephone system.

FIG. 17 illustrates a first location X at which a person Px is talking on a public telephone PTx connected by way of telephone line TLx to central telephone exchange CTE located at a second location V. A cellular base station CBSy, located at a location Y, has a cellular antenna CAy and includes a cellular base transceiver CBTy; which cellular base transceiver CBTy is connected by way of plural telephone lines PTLy with central telephone exchange CTE. A dual-function base-station DFBSz is located at a third location Z; which dual-function base-station DFBSz is connected with central telephone exchange CTE by way of plural telephone lines PTLZ. A person Pw, located at a fourth location W, holds a dual-function hand-piece DFHPw.

Details of Operation

The operation of the preferred embodiment of the cordless-cellular telephone system illustrated by FIGS. 9 through 17 is explained as follows.

Dual-function base station DFBS1 and dual-function hand-piece DFHP1 of FIGS. 9 and 10 are further illustrated by way of FIGS. 11 and 12.

In the arrangement represented by FIGS. 11 and 12, dual-function hand-piece DFHP1 is seen positioned (or cradled) in a designated indented area (or section) of dual-function base-station DFBS1. When so cradled, inductive pick-up loop IPULhp (which is located in flip-stand HFShp, which is hinged to the main body of hand-piece DFHP1) couples inductively with inductive supply loop ISL1, thereby picking up high-frequency (e.g., 20–50 kHz) AC power from inverter-type power supply IPS1 and supplying this AC power to the input terminals of rectifying voltage conditioner RVChp. From its output terminals, voltage conditioner RVC1 charges rechargeable battery RBhp, whose DC battery voltage is used controllably for powering either or both of transceivers HPT1 and HPT2.

Control input/output terminals from each of transceivers HPT1 and HPT2 are connected with control interface-panel CIPhp, from which control interface-panel a person may, by manual input means (such as by depressing one or more of the various keys shown in FIG. 12) provide programmable instructions with respect to: (i) which transceiver is to be connected with the microphone and/or the earphone, (ii) which transceiver is to be activated for transmission and/or reception, (iii) what telephone number-code is to be transmitted, (iv) what conditions must prevail to cause operation to be automatically switched over from one transceiver to the other transceiver, (v) etc.

For reasons a clarity, and due to the fact that the details of their operations and connections are well known, hand-piece DFHP1 of FIG. 11 is shown without a microphone means and an earphone means; which two elements are indeed present in DFPH1 and controllably connectable (by way of control interface-panel CIPhp) with either or both of transceivers HPT1 and HPT2.

Transceivers HPT1 and HPT2 are both connected with multi-function hand-piece antenna MFHA1, and are so designed as to permit (e.g., by frequency separation and/or by time separation means) each transceiver to transmit and/or receive at the same time without causing disabling interference. Techniques for accomplishing such function are well known to persons possessing ordinary skill in the particular art pertinent hereto and need not be further explained here.

Thus, for instance: transceiver HPT1 may be transmitting on a frequency of (say) 50 MHz and receiving on a frequency of 55 MHz; while transceiver HPT2 may be transmitting on a frequency of (say) 900 MHz and receiving on a frequency of 910 MHz.

In ordinary cellular and cordless telephones, the transmitter and receiver of the transceiver built into each of these cellular and cordless telephones are each functional, respectively, to transmit and receive on several different individual channels; and so it is as well with each of the two transceivers in hand-piece DFHP1. That is, hand-piece DFHP1 is in reality an integrated combination of a cellular telephone and a cordless telephone, using a cellular-type (i.e., cellular-dedicated) transceiver (e.g., transceiver HPT1) to provide telephonic connection with a regular cellular telephone system and a cordless (i.e., cordless-dedicated) transceiver (e.g., transceiver HPT2) to provide telephonic connection with a cordless telephone base-station; which cordless base-station, in turn, provides for connection with an ordinary (i.e., non-wireless-type or non-cellular-type) telephone system (as well as, optionally or alternatively, with a cellular-type telephone system). Thus, in one functional mode, hand-piece DFHP1 may be properly characterized as the cordless (or wireless) equivalent of an ordinary (e.g., non-wireless-type) two-line telephone.

In overall operation, dual-function hand-piece DFHP1 functions as follows.

In its usual mode of operation, when hand-piece DFHP1 is positioned in its cradle on base station DFBS1: (i) its battery RBph is being charged, (ii) the receiver-part of each of transceivers HPT1 and HPT2 is turned ON and rendered functional to receive wireless telephonic signals, (iii) whenever a telephonic signal is indeed received by either transceiver, an audible signal is provided from the hand-piece so as to cause a person located nearby to become aware of the presence of an incoming telephonic message, and (iv) the presence of the high-frequency AC voltage at the output terminals of inductive pick-up loop IPULL is received by an input terminal of control interface-panel CIPhp and operative to cause the control interface-panel to enter a base operating mode commensurate with the fact that the hand-piece is resting in its base charging cradle CCbs.

When hand-piece DFHP1 is removed from its base charging cradle CCbs, the high-frequency AC voltage is likewise removed from the output terminals of inductive pick-up loop IPUL1, thereby causing the control interface panel CIP1 to exit its base operating mode and enter instead a cordless operating mode; which cordless operating mode is characterized by the hand-piece being removed from its base charging cradle while at the same time being in cordless connection with its base-station.

However, if the hand-piece were to be removed from its base charging cradle while at the same time a telephonic signal (whether of cellular-type or cordless-type) is being received by its antenna, it will not only enter its cordless mode, but it will also enter an in-use mode; which in-use mode is characterized by permitting a telephone conversation to be carried out (with the party originating the telephonic signal) without initiating further commands (such as pressing one of the keys of the control interface-panel). Of course, at the end of the conversation (to prepare for other telephone calls), a hang-up command has to be provided; which hang-up command may be provided: (i) by placing the hand-piece back into its base charging cradle, (ii) by closing flip-stand HFShp so as to cause it to lie flush with the main body of the hand-piece, or (iii) by keying-in an express hang-up command. (Thus, the provision of the high-frequency AC voltage at the output terminals of inductive pick-up loop IPULL serves as a hang-up command.)

In its cordless mode, depending upon commands having been provided to the control interface-panel, hand-piece DFHP1 may receive telephone calls either from the cellular telephone system or from its base-station. When receiving a telephonic signal (from either source) while existing in its cordless mode, a person can accept and receive such telephonic signal by executing one of three simple accept-call commands: (i) move flip-stand HFShp from a closed position (i.e., flush with the main body of the hand-piece) to an open position (i.e., at an angle of about 90 degrees or more with respect to the main body of the hand-piece); (ii) with the flip-stand in an open position, by pressing a certain key on the control interface-panel; or (iii) optionally, with the flip-stand in an open position, by moving (e.g., lightly shaking) the main body of the hand-piece while at the same time or shortly thereafter talking into the microphone Mph. (For sake of clarity, the inertial switch means required for sensing movement of the hand-piece is not expressly illustrated.)

While in use in its cordless mode, the receiver of the cordless-dedicated transceiver (e.g., HPT2) senses the strength of the wireless telephonic signal being received from the base-station and conveys a corresponding cordless strength signal to an input terminal means of the control interface-panel. If the cordless signal strength were to fall below a predetermined level and remain there for longer than a predetermined brief period of time, a corresponding warning signal will be provided to the user, thereby indicating to him the imminent possibility of loss of cordless telephonic signal.

On perceiving such warning signal, the user may—by executing a certain cellular-directed command (e.g., by depressing a certain key on the control interface-panel, thereby initiating a pre-programmed transfer procedure)— initiate a transfer of his on-going cordless-mode telephone conversation (which is being conveyed by a first one of the two telephone lines by which the base-station is connected with the telephone utility company) to a cellular-mode telephone conversation. The hand-piece will effectuate such transfer by causing the transmitter in the cordless-dedicated transceiver in the hand-piece to transmit a predetermined transfer-code signal to the base-station. On receipt of this transfer-code signal, the base-station connects with the second of said two telephone lines (thereby effectively connecting the two telephone lines together at the base-station) and dials thereinto the hand-piece's cellular telephone number. Thus, as a result of this automatic dialing of the hand-piece's cellular telephone number, said second telephone line will (by way of the cellular telephone system) connect with the receiver of the cellular-dedicated transceiver in the hand-piece; which, upon receiving the resulting cellular telephonic signal, will automatically change from cordless-mode to cellular-mode, thereby enabling the user (in a substantially seamless non-interrupted manner) to continue his conversation by way of the cellular telephone system.

That is, if a person were to be carrying on a cordless-mode conversation by way of hand-piece DFHP1, and if he were to move away from the base-station far enough to cause the signal-strength of the cordless signals to diminish below a certain level (thereby indicating possible loss of telephonic connection), he may—by pressing a "transfer-to-cellular" key—cause his telephonic connection to be transferred (by action of the base-station) from cordless-mode to cellular-mode; which, as seen from one perspective, means that his direct (cordless) connection with his base-station has been converted to an indirect connection with his base-station— with the indirect connection to the base-station being effectuated by way of a cellular telephone system and the base-station's second telephone line.

Alternatively, the function served by the base-station's second telephone line can instead be served with the cellular telephone function built into the base-station; which cellular telephone function is effectuated by one of the base-station's two transceivers BST1 and BST2.

Otherwise, with reference to FIG. 11, the operation of dual-function base-station DFBS1 may be explained as follows.

Both transceivers BST1 and BST2 are connected with, as well as powered from, the DC input/output terminals of rechargeable battery RBbs; which DC input/output terminals are also connected with the DC output terminals of voltage conditioner VCbs, whose AC power input terminals are (as long as multi-conductor connect cord MCCC1 is indeed plugged into the base-station's male multi-prong receptacle) connected with a source of AC power line voltage. Also connected with, as well as powered from, the DC input/output terminals is inverter-type power supply IPS1; from which high-frequency (i.e., 20–50 kHz) output current is supplied to inductive supply loop ISL1.

Thus, high-frequency current supplied from inverter-type power supply IPS1 excites (by way of magnetic field coupling) inductive supply loop ISL1, thereby permitting inductive pick-up loop IPULL in the flip-stand of the hand-piece to absorb high-frequency power from inductive supply loop ISL1 whenever the hand-piece is resting in its base-station's charging cradle (CCbs) as indicated in FIG. 11.

As long as multi-conductor connect cord MCCC1 does indeed function to connect the base-station with a source of AC power line voltage (or other AC or DC voltage), unidirectional current is provided from voltage-conditioner VCbs, thereby charging battery RBbs while also supplying the DC power drawn by inverter-type power supply IPS1 as well as by transceivers BST1 and BST2.

Of base-station transceivers BST1 and BST2: a first one (e.g., BST1) is dedicated to cellular-mode service; a second one (e.g., BST2) is dedicated to cordless-mode service. The cordless-dedicated transceiver (BST2) is connected with each of two telephone lines (via connect-cord MCCC1) as well as with the cellular-dedicated transceiver (BST1).

More particularly—by virtue of including programmable and/or automatic channel-switching means, automatic dialing means, signal-strength-sensing means, automatic transmitting and transponding means, etc.—the base-station cordless-dedicated transceiver (BST2) is far more than a mere transceiver. For instance, in addition to more-or-less conventional transmitting and receiving functions, the base-station cordless-dedicated transceiver (BST2) can (by being provided with appropriate instructions from the hand-piece) cause: (i) a first one (or, alternatively, a second one) of the two telephone lines (from MCCC1) to be connected with the base-station cellular-dedicated transceiver (BSC1); (ii) the cellular telephone number of hand-piece DFHP1 to be automatically dialed into the first (or, alternatively, second) telephone line; (iii) at certain times, a first special signal to be transmitted to the hand-piece, which first special signal is functional to indicate the strength of the signal being received by the base-station from the hand-piece; (iv) at certain other times (i.e., when not otherwise transmitting), periodically to transmit a second special signal, which second special signal is functional to be received by the hand-piece when not in use and to permit the hand-piece to respond in a transponder-like (or echo-like) manner; (v) sensing of the presence or non-presence of any such echo-like response from the hand-piece; (vi) in the absence of an appropriate echo-like response from the hand-piece, an incoming telephone call from either of the two telephone lines to be transferred to the cellular-dedicated base-station transceiver (BST1); (vii) via this transceiver BST1, automatic dialing into the cellular telephone system of the cellular telephone number of the hand-piece, thereby to effectuate telephonic connection with the hand-piece even when the hand-piece is outside of its usual cordless operating range; (vi) etc.

In effect, as long as connected with connect-cord MCCC1, base-station DFBS1 may be considered as a three-line telephone instrument—with one of the three lines being a wireless cellular line and two of the three lines being ordinary hard-wire telephone lines.

By virtue of including rechargeable battery RBbs, base-station DFBS1 can function even if the AC (or DC) power normally supplied via connect-cord MCCC1 is removed. Also, by virtue of including cellular-dedicated transceiver BST1, base-station DFBS1 can function as a cordless base-station even when fully disconnected from its connect-cord MCCC1; which is to say, as illustrated by FIG. 14, base-station DFBS1 can serve as a fully portable base-station for hand-piece DFHP1, thereby permitting hand-piece DFHP1 to be used as a cordless telephone within its normal cordless operating range (with respect to base-station DFBS1), provided of course that base-station DFBS1 is located within the service area of a applicably functioning cellular telephone system. In other words, the arrangement illustrated by FIG. 14 constitutes a two-stage cordless (or wireless) telephone system, with a first wireless stage existing between the hand-piece and the base-station and a second wireless stage existing between the base-station and the cellular telephone system's cell antenna covering the area within which the base-station is located.

Further Comments re Combined Cordless-Cellular Telephone System (aa) In the combined cordless-cellular telephone system illustrated by FIGS. 9 through 17, all the different functional blocks and/or sub-systems therein identified may readily be procured and/or constructed by a person possessing ordinary skill in the art pertinent hereto. More particularly, such a person would readily be able to completely construct and/or implement the herein disclosed combined cordless-cellular telephone system on basis of the various functional features herein specified and/or described for that system.

(ab) As stated somewhat differently than hereinabove, instant combined cordless-cellular telephone system—especially as represented by the base-station and hand-piece of FIGS. 11 and 12—will provide for the following functional features.

1. In day-to-day use, a person will typically have base-station DFBS1 standing on his desk with hand-piece DFHP1 resting in its charging cradle CCbs. When a telephone call comes in via one of the two telephone lines, an appropriate signal will be provided from the hand-piece; and the person may then remove the hand-piece from its charging cradle and—without any further actions or commands—use it for conversation as he would the hand set of any ordinary cord-connected telephone instrument. Thus, after completing his conversation, the person would simply place the hand-piece back into its charging cradle, which action will automatically cause the base-station to disconnect from the particular telephone line via which the conversation took place.

2. Instead of "hanging up" by returning the hand-piece to its base-station charging cradle, the "hanging-up" may instead be accomplished: (i) by the action of closing flip-stand HFShp; (ii) by pressing a special "hang-up" key (e.g., CK8 of FIG. 12); (iii) by placing the hand-piece into some other charging cradle, such as ACC1 of FIG. 10; or (iv) with the flip-stand closed, by momentarily orienting the hand-piece in a substantially vertical position (or, alternatively, by briefly shaking it up and down).

3. When removed from its charging cradle, the hand-piece may stand on a desk or table, resting on its flip-stand, or it may be carried in a pocket (or lie on a table) with the flip-stand in a closed position. Then, when a call comes in—whether via the cellular-dedicated transceiver or the cordless-dedicated transceiver—a person may "pick up the phone" and initiate a conversation either by moving the flip-stand toward an open position, or simply by briefly shaking the hand-piece followed shortly thereafter with talking into the microphone (Mhp of FIG. 12). However, it is not necessary to open the flip-stand in order to respond to an incoming telephone call; while, of course, to place a telephone call it would be necessary to open the flip-stand so as to get access to the programming keys.

In this connection, it is noted that arrangements have been made for microphone Mhp not to be covered by the flip-stand when it is closed.

4. In its cordless operating mode, hand-piece DFHP1 may be commanded (by way of pushing one or more keys on its control interface-panel) to have either or both of its receivers activated. With the receivers of both the cellular-dedicated and the cordless-dedicated transceivers (e.g., HPT1 and HPT2, respectively) activated, telephonic calls may be made (i.e., received and/or placed) by way of either a cellular telephone system or the base-station. Thus, hand-piece DFHP1 is in reality a portable two-line telephone instrument having: (i) one of its two lines wirelessly routed to dedicated base-station DFBS1 (and therefrom to either a regular hard-wire telephone line or wirelessly to a first cellular telephone system); and (ii) the other one of its two lines wirelessly routed to and via a second cellular telephone system. In fact, as long as the hand-piece's base-station has hard-wire connection with two ordinary telephone lines in addition to wireless connection with a cellular telephone system, and since the hand-piece is operable to place and/or receive telephone calls via any of the three telephonic lines connected to/with the base-station, the hand-piece (as long as positioned within cordless range of its base-station) may actually be characterized as being a four-line telephone instrument.

5. Of course, without making provisions to the contrary, when beyond the cordless range of its base-station, hand-piece DFHP1 becomes a single-line telephone instrument instead of a four-line telephone instrument.

However, provisions are made whereby—in response to pressing a predetermined set of keys on the control interface-panel—the usually cordless-dedicated transceiver (HPT1) will convert so as to function as a cellular-mode transceiver; which therefore (optionally and controllably) makes hand-piece DFHP1 a two-line telephone instrument even when moved outside of its usual cordless range.

Thus, by virtue of incorporating the feature of cellular/cordless convertibility into one of its transceivers (e.g, HPT1), hand-piece DFHP1 becomes in fact a portable telephone instrument that is controllably convertible between being a cordless telephone instrument and being a cellular telephone instrument.

6. As indicated by FIG. 13, hand-piece DFHP1 may be removed from its base-station charging cradle—such as when a person leaves his office for his trip home at the end of the day—and used as an ordinary cellular telephone instrument.

For purposes of illustration, if the person were to be carrying on a telephone conversation via hand-piece DFHP1 at the time of leaving his office, he could continue that conversation as he moves away from his desk and out of cordless range. As soon as one of the cordless signal strengths (i.e., either the strength of the signal received by the base-station or the strength of the signal received by the hand-piece) were to diminish below a predetermined level, his conversation would—provided had previously keyed-in instructions on the hand-piece's control interface-panel to such effect—automatically be transferred to the cellular telephone system. Thus, he could continue his conversation in a substantially uninterrupted manner: (i) as he leaves his office, automatically shifting from cordless-mode operation to cellular-mode operation, and (ii) subsequently, as he again approaches an appropriate base-station (e.g., in his home), automatically shifting back again to cordless-mode operation, all in a substantially seamless manner.

7. The cellular-dedicated transceiver (HPT1) of hand-piece DFHP1 has a certain cellular telephone number, as does the cellular-dedicated transceiver (BST1) of base-station DFBS1; which two telephone numbers may be different from one another. However, since a person would not normally need to use the base-station cellular telephone means and the hand-piece cellular telephone means at the same time, it is—at least in certain circumstances— preferable that the two telephone numbers be the same.

8. Otherwise, various other uses and/or applications of hand-piece DFHP1 and/or base-station DFBS1 are illustrated in a mostly self-explanatory manner in and by FIGS. 9–10 and 15–17.

FIG. 15 illustrates a situation wherein base-station DFBS1 is supported by a tethered earostat AS, thereby providing for an extra large operating range. Clearly, by provising for a plurality of spaced-apart tethered earostats, each carrying a base-station similar to DFBS1 except for having capacity for handling (i.e., transmitting and/or receiving) a plurality of wireless telephonic channels, a "poor man's" cellular telephone system will result. In this connection, it is noted that a tethered earostat may be kept afloat at altitudes as high as 15,000 feet for months at a time without requiring maintenance.

(Of course, rather than hanging outside underneath the aerostat, the base-station would in reality be housed within a special section of the earostat—typically in a protective "bubble" underneath its main body.)

In other words, a multi-channel wireless base-station in an aerostat would be substantially similar to that associated with antenna RAT2 of the (micro-cellular) office telephone system illustrated by FIG. 7 and indicated by office OF as being present within office building OB of FIG. 15; which situation is further illustrated by FIG. 16, which shows a person using a hand-piece DFHP2 for wireless communication with multi-function antenna MFBA2 mounted in suspended ceiling SC of office OF.

FIG. 17 provides an overall block/system diagram of instant combination cordless-cellular telephone system as well as an overview of an expectedly typical usage situation associated with a base-station such as DFBS1 (in this case identified as DFBSz) and a hand-piece such as DFHP1 (in this case identified as DFHPw).

(ac) In base-station DFBS1, transceiver DST2 serves a function additional to that of being a transceiver; it also serves the function of a telephone line switcher in that (depending on commands having been provided from hand-piece DFHP1) it may cause one of the two hard-wire telephone lines to be connected directly to the other of the two hard-wire telephone lines, or it may cause one of these two telephone lines to be connected to transceiver HPT1.

(ad) For sake of clarity, several necessary component parts of hand-piece DFHP1 are not expressly shown in FIG. 11. For instance, a microphone and an earphone are definitely required but are not shown in FIG. 11 (although they are indicated in FIG. 12 as Mph and EPhp, respectively). Moreover (and inter alia), electrically actuatable switching means are required for appropriately switching the microphone and earphone to and/or from transceivers HPT1 and HPT2, etc.

These several necessary not-expressly-illustrated component parts are interconnected with the component parts actually illustrated in manners well known and, since they and their specific means for interconnection form no inventive part of instant disclosure, need no further explanation.

(ae) An important feature of instant invention relates to using hand-piece DFHP1 as a transponder to base-station DFBS1, and—under certain circumstances—vice versa. Thus, even when no cordless telephonic communication occurs between the hand-piece and the base-station, the base-station emits periodic wireless signals. More particularly, when not being used for conveying a cordless telephone conversation, the cordless-dedicated transceiver in the base-station (BST2) emits periodic inquiry signals intended for its associated hand-piece and then "listens" for a response from that hand-piece. Under conditions when the it receives no such response, the base-station will re-route a telephone call coming in on one of the two (hard-wire) telephone lines by automatically dialing the hand-piece's cordless telephone number into the other of the two (hard-wire) telephone lines; thereby effectuating connection of the incoming telephone call to the hand-piece.

(af) The level of transmitting power of an integral portable cellular telephone (i.e., a cellular telephone where the transmitting antenna may quite often be located relatively close to a person's head) is limited to a relatively low level (e.g., about 0.5 Watt). Otherwise, the transmitting power may permissibly be substantially higher (e.g., about 5.0 Watt). The same or similar limitations pertain to cordless telephones as well.

Thus, maximum permissible transmission power of hand-piece DFHP1 would be only about 0.5 Watt, while maximum permissible transmission power of base-station DFBS1 would be about 5.0 Watt.

Nevertheless, to minimize possible hazard associated with exposure to electromagnetic fields (as well as to provide for an added degree of protection from electronic eavesdropping), the level of transmitting power emitted from antenna MFHA1 is reduced to levels below the maximum permissible under conditions where adequate quality communication can be effectuated at such reduced power levels. In fact, in the preferred embodiment, the levels of transmitting power from the hand-piece's antenna as well as from the base-station's antenna are each controlled to be no higher than that necessary to attain adequate clarity of communication.

To effectuate such mutual control of levels of transmitting powers: (i) the hand-piece monitors the signal strength of the wireless signal received from the base-station and transmits information to that effect back to the base-station; and (ii) likewise, the base-station monitors the signal strength of the wireless signal received from the hand-piece and transmits information to that effect back to the hand-set. Thus, by way of methods well known and without disturbing the telephonic communication between the two, the hand-piece and the base-station each receives a signal effective to provide a measure of the strength of the signal transmitted by it but as received by the other, thereby permitting its level of transmitted power automatically to be adjusted such as to maintain this measure of signal strength at a desirable level.

In other words, by providing each other with information regarding strength of signal received, the base-station and the hand-piece each automatically adjusts its level of transmission power to be only as high as necessary for adequate clarity of telephonic communication. Thus, when using the hand-piece and base-station in the manner of an ordinary cord-type telephone, only miniscule levels of power would be transmitted and hazards related to exposure to electromagnetic radiation, as well as opportunities for electronic eavesdropping, would be greatly diminished. On the other hand, when using the hand-piece at greater distances from the base-station, transmitting powers would automatically be increased as needed to maintain clarity in telephonic communication, but not higher than certain pre-determined levels.

In cellular applications, by providing for the cellular base-station to monitor the strength of the signal received from a cellular telephone (e.g., DFHP1) and to transmit information to that effect back to the cellular telephone, the level of transmitting power of the cellular telephone can similarly be adjusted so as not to be higher than necessary.

(ag) Some of the possibly unconventional terms used in the disclosure of instant invention—and which might not be sufficiently clearly understood from the context—are defined as follows.

1. The term "hand-piece" refers to a portable entity including, among other things, a microphone, an earphone, keys for keying-in alpha-numeric instructions, an alpha-numeric display means, an electric battery, a programmable control and switching means, one or more antennas, one or more transceivers, etc.—or the functional equivalents thereof. In a more general sense, a hand-piece is a portable cordless and/or cellular telephone instrument useful for placing and/or receiving telephone calls by wireless means. The term "hand-set" means the same as the term "hand-piece".

2. The term "base-station" refers to an entity or arrangement including, among other things, an electric battery, a programmable control and switching means, one or more antennas, one or more transceivers, means by which to connect with one or more telephone lines of a public utility telephone company, etc.—or the equivalents thereof. A base-station may be portable (as is base-station DFBS1) or permanently installed (as is usually the case with a cellular base-station). In a more general sense, a base-station is a telephone intrument functional to connect with a public telephone system as well as with a portable cordless and/or cellular telephone instrument.

3. The term "hard-wired telephone line" refers to a connection with a telephone line of a telephone system (such as an ordinary public telephone system) that is effectuated by means other than wireless means. Thus, a hard-wired telephone line would define a telephone line that is connected by way of a physical or material signal conduit, such as a glass fiber or a pair of electrical wires.

4. The term "telephonic" refers to: (i) having telephone-like or telephone-related functions and/or features; or (ii) being characterized by and/or related to telephone or telephone-related products, entities, functions, actions, etc.

5. The term "cordless range" refers to the maximum distance (as measured from a base-station) over which a telephone conversation can effectively be carried out between a hand-piece and this base-station.

The cordless range depends on the level of power transmitted from the base-station's transmitter-antenna-combination, the level of power transmitted from the hand-piece's transmitter-antenna-combination, the effective sensitivities of the receiver-antenna-combinations of the base-station and the hand-piece, the mutual orientation of the antennas, the effects of intervening and/or surrounding structures, etc. In any case, the effective cordless range is highly dependent upon the level of power transmitted from the base-station and/or the hand-piece: the lower the level of power, the shorter the effective cordless range. Other things being roughly equal, the cordless range would be approximately proportional to the one-third power (i.e., the third root) of the level of transmitted power; which means that—if the maximum useful range were to be (say) 200 feet on basis of maximum permissible power levels (i.e., about 0.5 Watt and 5.0 Watt for the hand-piece and the base-station, respectively)—for a range of (say) only 20 feet (i.e., as in case of ordinary desk-bound telephone usage), the level of transmitted power would not need to be higher than about one thousandth of the level required for a cordless range of about 200 feet. Thus, for ordinary day-to-day desk-bound telephone usage, a cordless telephone system—such as that represented by the base-station and the hand-piece of FIG. 11—need only to have the base-station transmitting about 5.0 milli-Watt of power and the hand-piece transmitting about 0.5 milli-Watt of power.

6. The term "cellular range" refers to the maximum distance (as measured from a cellular base station) over which two-way telephonic transmission can effectively be carried out between a cellular telephone instrument and its cellular base-station.

7. The term "wireless" refers to conveying signals by means other than mechanically tangible conduits, such as glass fibers or electric conductors. That is, wireless transmission means focused or broadcasted transmission of telephonic signals through space.

8. The term "public utility telephone system" refers to a telephone system operative to interconnect, and/or facilitate the transmission of, telephonic calls from and/or to points accessible to the public.

9. The term "wireless telephone instrument" refers to a cordless telephone instrument and/or a cellular telephone instrument.

10. The term "seamless" refers to a function involved in a change of mode, state, condition, operation, etc. where this change occurs smoothly and substantially without interruption of function.

11. The terms "cellular telephone system" and "micro-cellular telephone system" refer, respectively, to (a) a public telephone system accessible via a wireless telephone instrument; and (b) an arrangement such as that illustrated by FIGS. 4A, 4B and 7 of instant application, which arrangement is approximately identical to an ordinary cellular telephone system, except for: (i) having substantially smaller operating range per cell (typically limited to a single room within a building; and (ii) not being a public telephone system.

12. The term "portable wireless telephone instrument" refers to a telephone instrument suitable for being held and handled by a single individual and via which, without requiring physical (i.e., hard-wired) connection with a hard-wired telephone line nor with an external source of power, telephone calls may be effectuated. Thus, by inherent necessity, a portable wireless telephone instrument must include wireless receiver means as well as a wireless transmitting means, which means must respectively include a receiving antenna means and a transmitting antenna means.

13. The term "portable base-station" refers to an entity suitable for being held and handled by a single individual and via which, without requiring physical (i.e., hard-wired) connection with a hard-wired telephone line nor with an external source of power, telephonic connections may be effectuated. Thus, by inherent necessity a portable base-station must include a dual-function wireless receiver means as well as a dual-function wireless transmitting means, which means must respectively include a dual-function receiving antenna means and a dual-function transmitting antenna means—where a dual-function wireless transmitting means refers to a transmitting means operable to transmit two independent telephonic signals at the same time, and a dual-function receiving means refers to a receiving means operable to receive two independent telephonic signals at the same time.

(ah) In the cordless telephone system illustrated by FIG. 11, it is reiterated that: (i) telephone conversations can be received and carried out by the hand-piece, totally without opening its flip-stand; (ii) the level of power transmitted by the hand-piece's antenna is controlled (via internal feedback in the transceivers) so as to be no higher than necessary to cause acceptable telephonic communication with its (cordless or cellular) base station; (iii) the base-station is portable and may be used as a cordless base-station anywhere within the range of a cellular telephone system; (iv) when moved beyond cordless range of its base-station, the hand-piece automatically switches from a cordless mode to a cellular mode, thereby to continue to constitute a totally portable wireless telephone instrument; and (v) if the hand-piece were to be moved beyond its cordless range while being used for a conversation, the wireless telephonic connection from the hand-piece would automatically be transferred from its cordless base-station to the appropriate cellular base-station, thereby permitting the conversation to be continued in a substantially uninterrupted seamless manner.

I claim:

1. A cordless telephone system comprising:
a base telephone apparatus connected with the signal conductors of a telephone utility company and operative to transmit and/or receive telephone signals by way of those signal conductors; the base telephone apparatus including a base antenna as well as a first base transceiver connected between the signal conductors and the base antenna; the first base transceiver being operative to transmit and/or receive wireless signals by way of the base antenna; the base telephone apparatus also including a second base transceiver functional to provide telephonic connection with a cellular telephone system independent of the first base transceiver; and a hand-set having a first hand-set transceiver connected with a hand-set antenna and operative to transmit and/or receive wireless signals, thereby to permit wireless telephonic connection with the base telephone apparatus by way of the base antenna; the hand-set being characterized by also including a second hand-set transceiver; the second hand-set transceiver being operable to transmit and/or receive wireless signals independent of the first hand-set transceiver.

2. The system of claim 1 wherein the first base transceiver is connected in circuit with the second base transceiver such as to permit telephonic connection between the first hand-held transceiver and the cellular telephone system.

3. An arrangement comprising:
a first telephone instrument operable to provide for telephonic connection with a public telephone system, thereby permitting a first person to use the first telephone instrument to effectuate telephone calls via the public telephone system;
a portable wireless telephone instrument operable by way of a wireless base-station to provide for telephonic connection with the public telephone system, thereby permitting a second person to use the portable wireless telephone instrument to effectuate telephone calls via the public telephone system;
a first wireless base-station operable to effectuate telephonic connection between a portable wireless telephone instrument and the public telephone system; and
a second wireless base-station operable to effectuate telephonic connection between a portable wireless telephone instrument and the public telephone system;
thereby to permit the first person to carry on a telephone conversation with the second person via both the first and the second wireless base-stations;
in which arrangement:
(i) the first wireless base-station is a base-station for a cordless telephone system, and
(ii) the second wireless base-station is one of plural base-stations in a cellular telephone system.

4. A structure characterized by comprising:
a rechargeable battery;
an antenna;
a telephone receptacle operable to receive and hold a telephone plug, thereby to provide for disconnectable connection with at least one hardwired telephone line to a public telephone facility;
a first and a second transceiver, each connected with the battery and the antenna, at least the first transceiver also connected with the telephone receptacle; and
a cradle for holding a portable cordless telephone instrument;
the arrangement being further characterized by being functional, even if not being connected with said at least one hardwired telephone line, to effectuate telephonic connection between a portable cordless telephone instrument and a cellular telephone base station.

* * * * *